(12) United States Patent
Schneiderman et al.

(10) Patent No.: US 6,829,384 B2
(45) Date of Patent: Dec. 7, 2004

(54) OBJECT FINDER FOR PHOTOGRAPHIC IMAGES

(75) Inventors: Henry Schneiderman, Pittsburgh, PA (US); Takeo Kanade, Pittsburgh, PA (US)

(73) Assignee: Carnegie Mellon University, Pittsburgh, PA (US)

(*) Notice: Subject to any disclaimer, the term of this patent is extended or adjusted under 35 U.S.C. 154(b) by 668 days.

(21) Appl. No.: 09/795,208

(22) Filed: Feb. 28, 2001

(65) Prior Publication Data

US 2002/0159627 A1 Oct. 31, 2002

(51) Int. Cl.[7] .................................................. G06K 9/00
(52) U.S. Cl. ........................ 382/154; 382/240; 382/285; 375/240.19
(58) Field of Search ................................ 382/115, 118, 382/159, 180, 209, 154, 162, 165, 285, 240; 706/21, 52; 700/83; 375/240.19; 345/810, 840; 348/42, 51

(56) References Cited

U.S. PATENT DOCUMENTS

| | | | |
|---|---|---|---|
| 5,642,431 | A | 6/1997 | Poggio et al. |
| 5,710,833 | A | 1/1998 | Moghaddam et al. |
| 6,072,893 | A | 6/2000 | Luo et al. |
| 6,128,397 | A | 10/2000 | Baluja et al. |
| 6,134,339 | A | 10/2000 | Luo |
| 6,192,145 | B1 * | 2/2001 | Anandan et al. ............ 382/154 |
| 6,211,515 | B1 * | 4/2001 | Chen et al. ............... 250/252.1 |
| 6,272,231 | B1 * | 8/2001 | Maurer et al. .............. 382/103 |
| 6,381,280 | B1 * | 4/2002 | Lynch et al. ........... 375/240.19 |
| 6,567,081 | B1 * | 5/2003 | Li et al. ..................... 345/419 |
| 6,597,739 | B1 * | 7/2003 | Li et al. ................ 375/240.19 |
| 6,671,391 | B1 * | 12/2003 | Zhang et al. ............... 382/118 |

OTHER PUBLICATIONS

Amit et al., Discussion of the Paper "Arcing Classifiers" by Leo Breiman, The Annals of Statistics, vol. 26, No. 3, 1998, pp. 833–837.

Breiman, L., Arcing Classifiers, The Annals of Statistics, vol. 26, No. 3, 1998, pp. 801–823.

Burel et al., Detection and Localization of Faces on Digital Images, Pattern Recognition Letters 15, 1994, pp. 963–967.

Burl et al., Recognition of Planar Object Classes, CVPR 1996, pp. 223–230.

Colmenarez et al., Face Detection with Information–Based Maximum Discrimination, CVPR 1997, pp. 782–787.

(List continued on next page.)

*Primary Examiner*—Bhavesh M. Mehta
*Assistant Examiner*—Sheela Chawan
(74) *Attorney, Agent, or Firm*—Kirkpatrick & Lockhart LLP

(57) ABSTRACT

An object finder program for detecting presence of a 3D object in a 2D image containing a 2D representation of the 3D object. The object finder uses the wavelet transform of the input 2D image for object detection. A pre-selected number of view-based detectors are trained on sample images prior to performing the detection on an unknown image. These detectors then operate on the given input image and compute a quantized wavelet transform for the entire input image. The object detection then proceeds with sampling of the quantized wavelet coefficients at different image window locations on the input image and efficient look-up of pre-computed log-likelihood tables to determine object presence. The object finder's coarse-to-fine object detection strategy coupled with exhaustive object search across different positions and scales results in an efficient and accurate object detection scheme. The object finder detects a 3D object over a wide range in angular variation (e.g., 180 degrees) through the combination of a small number of detectors each specialized to a small range within this range of angular variation.

37 Claims, 17 Drawing Sheets

OTHER PUBLICATIONS

Cosman et al., Vector Quantization of Image Subbands: A Survey, IEEE Trans. On Image Processing, vol. 5, No. 2, Feb. 1996, pp. 202–225.

Dietterich, T.G., Discussion of the Paper "Arcing Classifiers" by Leo Breiman, The Annals of Statistics, vol. 26, No. 3, 1998, pp. 838–841.

Domingos et al., On the Optimality of the Simple Bayesian Classifier under Zero–One Loss, Machine Learning, 29, 1997, pp. 103–130.

Freund et al., A Decision–theoretic Generalization of On–line Learning and an Application to Boosting, Journal of Computer and System Sciences, vol. 55, No. 1, 1997, pp. 119–139.

Freund et al., Discussion of the Paper "Arcing Classifiers" by Leo Breiman, The Annals of Statistics, vol. 26, No. 3, 1998, pp. 824–832.

Moghaddam et al., Probabilistic Visual Learning for Object Representation, IEEE Trans. on Pattern Analysis and Machine Intelligence vol. 19, No. 7, Jul. 1997, pp. 696–710.

Osuna et al., Training Support Vector Machines: An Application to Face Detection, CVPR 1997, pp. 130–136.

Roth et al., A SNoW–Based Face Detector, Neural Information Processing Systems, 1999, pp. 862–868.

Rowley et al., Neural Network–Based Face Detection, IEEE Trans. on Pattern Analysis and Machine Intelligence, vol. 20, No. 1, Jan. 1998, pp. 23–38.

Schapire et al., Improved Boosting Algorithms Using Confidence–rated Predictions, Machine Learning, 37(3), 1999, pp. 297–336.

Schneiderman et al., Probabilistic Modeling of Local Appearance and Spatial Relationships for Object Recognition, CVPR 1998, pp. 45–51.

Strang et al., Wavelets and Filter Banks, Wellesley–Cambridge Press, 1997, pp. 1–35, 103–142, 216–218.

Sung et al., Example–based Learning for View–based Human Face Detection, M.I.T. AI Memo No. 1521, 1994, pp. 1–20.

Sung, K., Learning and Example Selection for Object and Pattern Detection, M.I.T. AI Lab. Tech Report No. 1572, 1996, pp. 1–195.

Vapnik, V.N., The Nature of Statistical Learning Theory, Springer, 1995, pp. 127–137.

Yang et al., Human Face Detection in a Complex Background, Pattern Recognition, 27(1), 1994, pp. 53–63.

* cited by examiner

Challenges in Object Detection

- Intra-class variation

- Lighting variation

- Geometric variation

- 2 classifiers trained for faces.

- 8 classifiers trained for cars.

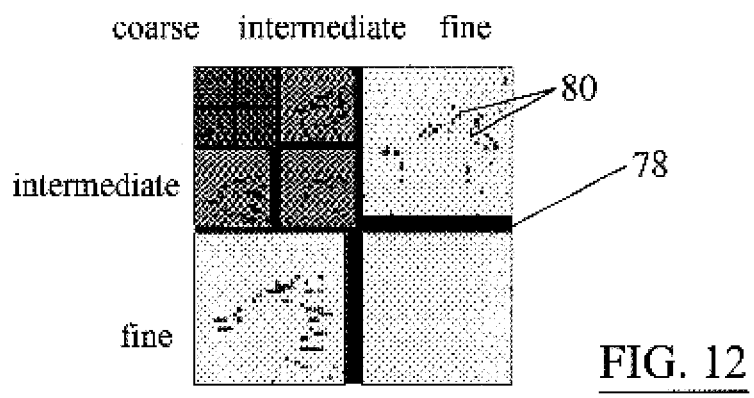
FIG. 12
Wavelet Decomposition
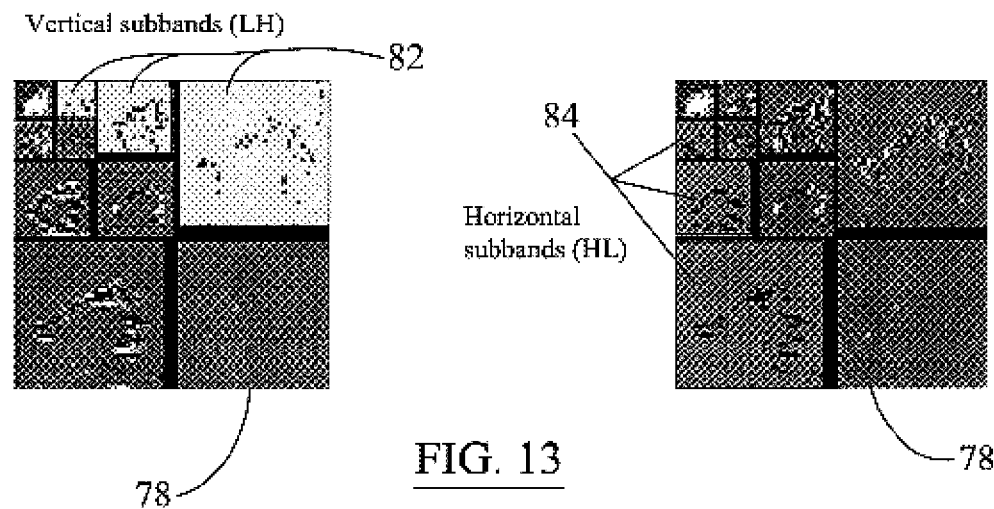
FIG. 13
Intra-Subband Operators
| | level | subband |
|---|---|---|
| $f_1(i,j)$ | 1 | LL |
| $f_2(i,j)$ | 1 | LH |
| $f_3(i,j)$ | 1 | HL |
| $f_4(i,j)$ | 2 | LH |
| $f_5(i,j)$ | 2 | HL |
| $f_6(i,j)$ | 3 | LH |
| $f_7(i,j)$ | 3 | HL |
FIG. 14

Inter-orientation operators

| | level | subbands |
|---|---|---|
| $f_8(i,j)$ | 1 | LH-HL |
| $f_9(i,j)$ | 2 | LH-HL |
| $f_{10}(i,j)$ | 3 | LH-HL |

Inter-frequency operators

| | levels | subband |
|---|---|---|
| $f_{11}(i,j)$ | 1 | LL, LH |
| $f_{12}(i,j)$ | 1 | LL, HL |
| $f_{13}(i,j)$ | 1, 2 | HL |
| $f_{14}(i,j)$ | 1, 2 | LH |
| $f_{15}(i,j)$ | 2, 3 | HL |
| $f_{16}(i,j)$ | 2, 3 | LH |

Inter-frequency, Inter-orientation

Probabilities Estimated Off-Line

Computing look-up tables for i = 1...p

Combining look-up tables to get final
look-up table (d) used for classification

Adding corresponding
entries in look-up tables $f_1(i,j) = 5^0 q_{3,LH}(i,j) + 5^1 q_{3,LH}(i,j+1) + \ldots + 5^5 q_{3,LH}(i+3,j+2)$

Make Decision $P_1(\#5710, 0, 0 \mid obj) = 0.53$ $P_1(\#5710, 0, 0 \mid non\text{-}obj) = 0.56$ $P_1(\#3214, 0, 1 \mid obj) = 0.57$ $P_1(\#3214, 0, 1 \mid non\text{-}obj) = 0.48$ $$\frac{0.53 * 0.57 * \ldots * 0.83}{0.56 * 0.48 * \ldots * 0.19} > \lambda$$

$P_k(\#723, n, m \mid obj) = 0.83$ $P_k(\#723, n, m \mid non\text{-}obj) = 0.19$

OBJECT FINDER FOR PHOTOGRAPHIC IMAGES

STATEMENT REGARDING FEDERALLY SPONSORED RESEARCH OR DEVELOPMENT

The present invention has been supported by the United States Department of Defense through grants MDA904-98-C-A915 and MDA904-00-C-2109. The United States government may have certain rights in this invention.

BACKGROUND OF THE INVENTION

1. Field of the Invention

The present invention broadly relates to image processing and image recognition, and more particularly, to a system and method for detecting presence of 3D (three dimensional) objects in a 2D (two dimensional) image containing 2D representation of the 3D objects.

2. Description of the Related Art

Object recognition is the problem of using computers to automatically locate objects in images, where an object can be any type of three dimensional physical entity such as a human face, automobile, airplane, etc. Object detection involves locating any object that belongs to a category such as the class of human faces, automobiles, etc. For example, a face detector would attempt to find all human faces in a photograph, but would not make finer distinctions such as identifying each face.

The challenge in object detection is coping with all the variations that can exist within a class of objects and the variations in visual appearance. FIG. 1A illustrates a picture slide 10 showing intra-class variations for human faces and cars. For example, cars vary in shape, size, coloring, and in small details such as the headlights, grill, and tires. Similarly, the class of human faces may contain human faces for males and females, young and old, bespectacled with plain eyeglasses or with sunglasses, etc. Also, the visual expression of a face may be different from human to human. One face may appear jovial whereas the other one may appear sad and gloomy. Visual appearance also depends on the surrounding environment and lighting conditions as illustrated by the picture slide 12 in FIG. 1B. Light sources will vary in their intensity, color, and location with respect to the object. Nearby objects may cast shadows on the object or reflect additional light on the object. Furthermore, the appearance of the object also depends on its pose; that is, its position and orientation with respect to the camera. FIG. 1C shows a picture slide 14 illustrating geometric variation among human faces. A person's race, age, gender, ethnicity, etc., may play a dominant role in defining the person's facial features. A side view of a human face will look much different than a frontal view.

Therefore, a computer-based object detector must accommodate all this variation and still distinguish the object from any other pattern that may occur in the visual world. For example, a human face detector must be able to find faces regardless of facial expression, variation from person to person, or variation in lighting and shadowing. Most methods for object detection use statistical modeling to represent this variability. Statistics is a natural way to describe a quantity that is not fixed or deterministic such as a human face. The statistical approach is also versatile. The same statistical model can potentially be used to build object detectors for different objects without re-programming.

Prior success in object detection has been limited to frontal face detection. Little success has been reported in detection of side profile) views of faces or of other objects such as cars. Prior methods for frontal face detection include methods described in the following publications: (1) U.S. Pat. No. 5,642,431, titled "Network-based System And Method For Detection of Faces And The Like", issued on Jun. 24, 1997 to Poggio et al.; (2) U.S. Pat. No. 5,710,833, titled "Detection Recognition And Coding of Complex Objects Using Probabilistic Eigenspace Analysis", issued on Jan. 20, 1998 to Moghaddam et al.; (3) U.S. Pat. No. 6,128,397, titled "Method For Finding All Frontal Faces In Arbitrarily Complex Visual Scenes", issued on Oct. 3, 2000 to Baluja et al.; (4) Henry A. Rowley, Shumeet Baluja, and Takeo Kanade, "Neural Network-Based Face Detection", IEEE Transactions on Pattern Analysis and Machine Intelligence, 20:1, January 1998, pp. 23–28; (5) Edgar Osuna, Robert Freund, and Federico Girosi, "Training Support Vector Machines: An Application To Face Detection", Conference on Computer Vision and Pattern Recognition, 1997, pp. 130–136; (6) M. C. Burl and P. Perona, "Recognition of Planar Object Classes", Conference on Computer Vision and Pattern Recognition, 1996, pp. 223–230; (7) H. Schneiderman and T. Kanade, "Probabilistic Modeling of Local Appearance and Spatial Relationships for Object Recognition", Conference on Computer Vision and Pattern Recognition, 1998, pp. 45–51; (8) L. Wiskott, J-M Fellous, N. Kruger, C. v. d. Malsburg, "Face Recognition by Elastic Bunch Matching", IEEE Transactions on Pattern Analysis and Machine Intelligence, 19:7, 1997, pp. 775–779; and (9) D. Roth, M-H Yang, and N. Ahuja, "A SnoW-Based Face Detector", NIPS-12 (Neural Information Processing Systems), 1999.

The methods discussed in publications (1) through (9) mentioned above differ primarily in the statistical model they use. The method of publication (1) represents object appearance by several prototypes consisting of a mean and a covariance about the mean. The method in publication (5) consists of a quadratic classifier. Such a classifier is mathematically equivalent to representation of each class by its mean and covariance. These methods as well as that of publication (2) emphasize statistical relationships over the full extent of the object. As a consequence, they compromise the ability to represent small areas in a rich and detailed way. The methods discussed in publications (3) and (4) address this limitation by decomposing the model in terms of smaller regions. The methods in publications (3) and (4) represent appearance in terms of approximately 100 inner products with portions of the image. Finally, the method discussed in publication (9) decomposes appearance further into a sum of independent models for each pixel.

However, the above methods are limited in that they represent the geometry of the object as a fixed rigid structure. These methods are also limited in their ability to accommodate differences in the relative distances between various features of a human face such as the eyes, nose, and mouth. Not only can these distances vary from person to person, but their projections into the image can vary with the viewing angle of the face. For this reason, these methods tend to fail for faces that are not fully frontal in posture. This limitation is addressed by the publications (6) and (8), which allow for small amounts of variation among small groups of hand-picked features such as the eyes, nose, and mouth. However, by using a small set of hand-picked features these representations have limited power. The method discussed in publication (7) allows for geometric flexibility with a more powerful representation by using richer features (each takes on a large set of values) sampled at regular positions across the fall extent of the object. Each feature measurement is treated as statistically independent of all others. The disadvantage of this approach is that any relationship not explicitly represented by one of the features is not represented. Therefore, performance depends critically on the quality of the feature choices.

Finally, all of the above methods are structured such that the entire statistical model must be evaluated against the input image to determine if the object is present. This can be time consuming and inefficient. In particular, since the object can appear at any position and any size within the image, a detection decision must be made for every combination of possible object position and size within an image. It is therefore desirable to detect a 3D object in a 2D image over a wide range of variation in object location, orientation, and appearance. It is also desirable to perform the object detection in a computationally advantageous manner so as to conserve time and computing resources.

SUMMARY OF THE INVENTION

In one embodiment, the present invention contemplates a method to detect presence of a 3D (three dimensional) object in a 2D (two dimensional) image containing a 2D representation of the 3D object. The method comprises receiving a digitized version of the 2D image; selecting one or more view-based detectors; for each view-based detector, computing a wavelet transform of the digitized version of the 2D image, wherein the wavelet transform generates a plurality of transform coefficients, and wherein each transform coefficient represents visual information from the 2D image that is localized in space, frequency, and orientation; applying the one or more view-based detectors in parallel to respective plurality of transform coefficients, wherein each view-based detector is configured to detect a specific orientation of the 3D object in the 2D image based on visual information received from corresponding transform coefficients; combining results of application of the one or more view-based detectors; and determining orientation and location of the 3D object from the combination of results of application of the one or more view-based detectors.

In an alternative embodiment, the present invention contemplates a method of providing assistance in detecting the presence of a 3D object in a 2D image. The method comprises receiving a digitized version of the 2D image from a client site and over a communication network (e.g., the Internet); determining the location of the 3D object in the 2D image; and sending a notification of the location of the 3D object to the client site over the communication network.

In a still further embodiment, the present invention contemplates a computer-readable storage medium having stored thereon instructions, which, when executed by a processor, cause the processor to perform a number of tasks including the following: digitize a 2D image containing a 2D representation of a 3D object; compute a wavelet transform of the digitized version of the 2D image, wherein the wavelet transform generates a plurality of transform coefficients, and wherein each transform coefficient represents corresponding visual information from the 2D image; place an image window of fixed size at a first plurality of locations within the 2D image; evaluate a plurality of visual attributes at each of the first plurality of locations of the image window using corresponding transform coefficients; and estimate the presence of the 3D object in the 2D image based on evaluation of the plurality of visual attributes at the each of the first plurality of locations.

An object finder program according to the present invention improves upon existing methods of 3D object detection both in accuracy and computational properties. These improvements are based around the use of the wavelet transform for object detection. A pre-selected number of view-based detectors are trained on sample 2D images prior to performing the detection on an unknown 2D image. These detectors then operate on the given 2D input image and compute a quantized wavelet transform for the entire input image. The object detection then proceeds with sampling of the quantized wavelet coefficients at different image window locations on the input image and efficient look-up of pre-computed log-likelihood tables to determine object presence. The object finder's coarse-to-fine object detection strategy coupled with exhaustive object search across different positions and scales results in an efficient and accurate object detection scheme. The object finder detects a 3D object over a wide range in angular variation (e.g., 180 degrees) through the combination of a small number of detectors each specialized to a small range within this range of angular variation.

The object finder may be trained to detect many different types of objects (e.g., airplanes, cats, trees, etc.) besides the human faces and cars as discussed hereinbelow. Some of the applications where the object finder may be used include: commercial image databases (e.g., stock photography) for automatically labeling and indexing images; an Internet-based image searching and indexing service; finding objects of military interest (e.g., mines, tanks, etc.) in satellite, radar, or visible imagery; as a tool for automatic description of the image content of an image database; to achieve accurate color balancing on human faces and remove red-eye from human faces in a digital photo development; for automatic adjustment of focus, contrast, and centering on human faces during digital photography; and enabling automatic zooming on human faces as part of a security and surveillance system.

BRIEF DESCRIPTION OF THE DRAWINGS

Further advantages of the present invention may be better understood by referring to the following description taken in conjunction with the accompanying drawings, in which:

FIG. 12 shows a gradation of image details represented by a wavelet transform;

FIG. 13 shows three vertical subbands and three horizontal subbands in the wavelet decomposition shown in FIG. 11;

FIG. 14 shows seven intra-subband operators;

DETAILED DESCRIPTION OF PREFERRED EMBODIMENTS

Figure 1A:
FIGS. 1A–1C illustrate different challenges in object detection.
Figure 1B:
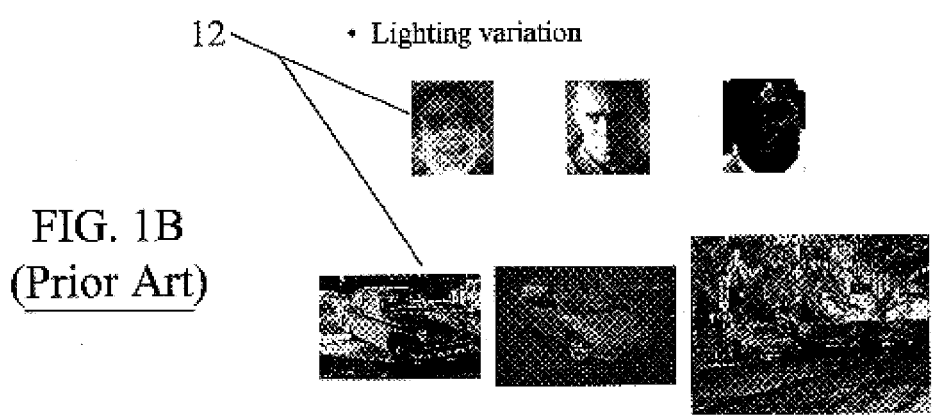
Figure 1C:
Figure 2:
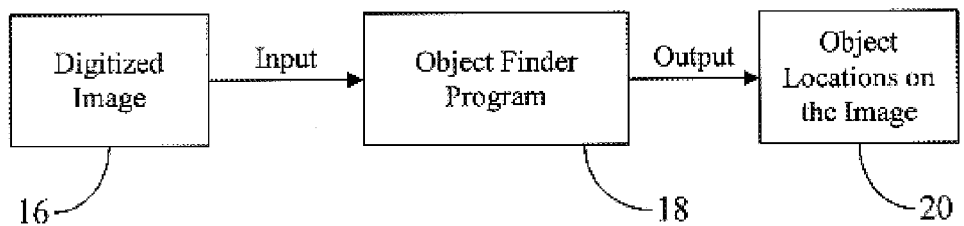
FIG. 2 illustrates an embodiment of a generalized operational flow for the object finder program according to the present invention.

FIG. 2 illustrates an embodiment of a generalized operational flow for the object finder program according to the present invention. The object finder program (simply, the "object finder") is represented by the block 18. A digitized image 16 is a typical input to the object finder 18, which operates on the image 16 and generates a list of object locations and orientations for the 3D objects represented in the 2D image 16. It is noted that the terms "image" and "digitized image" are used interchangeably hereinbelow. However, both of these terms are used to refer to a 2D image (e.g., a photograph) containing two dimensional representations of one or more 3D objects (e.g., human faces, cars, etc.). In one embodiment, as discussed hereinbelow in more detail, the object finder 18 may place object markers 52 (FIG. 6) on each object detected in the input image 16 by the object finder 18. The input image may be an image file digitized in one of many possible formats including, for example, a BMP (bitmap) file format, a PGM (Portable Grayscale bitMap graphics) file format, a JPG (Joint Photographic Experts Group) file format, or any other suitable graphic file format. In a digitized image, each pixel is represented as a set of one or more bytes corresponding to a numerical representation (e.g., a floating point number) of the light intensity measured by a camera at the sensing site.

Figure 3:
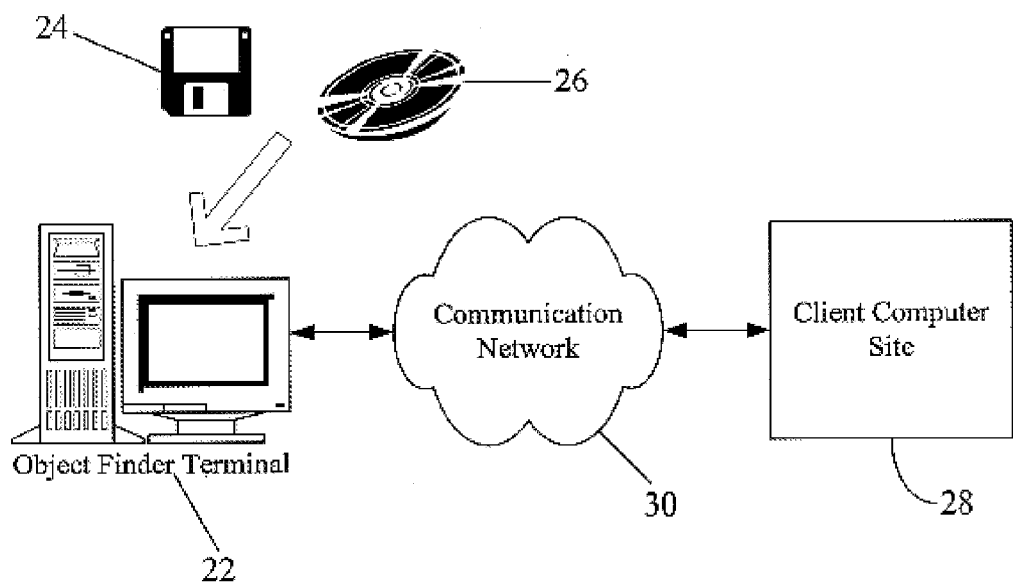
FIG. 3 depicts an exemplary setup to utilize the object finder program according to the present invention.

FIG. 3 depicts an exemplary setup to utilize the object finder program 18 according to the present invention. An object finder terminal or computer 22 may execute or "run" the object finder program application 18 when instructed by a user. The digitized image 16 may first be displayed on the computer terminal or monitor display screen and, after application of the object finder program, a marked-up version of the input image (e.g., picture slide 50 in FIG. 6) may be displayed on the display screen of the object finder terminal 22. The program code for the object finder program application 18 may be initially stored on a portable data storage medium, e.g., a floppy diskette 24, a compact disc 26, a data cartridge tape (not shown) or any other magnetic or optical data storage medium. The object finder computer 22 may include appropriate disk drives to receive the portable data storage medium and to read the program code stored thereon, thereby facilitating execution of the object finder software. The object finder software 18, upon execution by the computer 22, may cause the computer 22 to perform a variety of data processing and display tasks including, for example, analysis and processing of the input image 16, display of a marked-up version of the input image 16 identifying locations and orientations of one or more 3D objects in the input image 16 detected by the object finder 18, transmission of the marked-up version of the input image 16 to a remote computer site 28 (discussed in more detail hereinbelow), etc.

As illustrated in FIG. 3, in one embodiment, the object finder computer terminal 22 may be remotely accessible from a client computer site 28 via a communication network 30. In one embodiment, the communication network 30 may be an Ethernet LAN (local area network) connecting all the computers within a facility, e.g., a university research laboratory or a corporate data processing center. In that case, the object finder terminal 22 and the client computer 28 may be physically located at the same site, e.g., a university research laboratory or a photo processing facility. In alternative embodiments, the communication network 30 may include, independently or in combination, any of the present or future wireline or wireless data communication networks, e.g., the Internet, the PSTN (public switched telephone network), a cellular telephone network, a WAN (wide area network), a satellite-based communication link, a MAN (metropolitan area network) etc.

The object finder computer 22 may be, e.g., a personal computer (PC), a graphics workstation, or a computer chip embedded as part of a machine or mechanism (e.g., a computer chip embedded in a digital camera, in a traffic control device, etc.). Similarly, the computer (not shown) at the remote client site 28 may also be capable of viewing and manipulating digital image files transmitted by the object finder terminal 22. In one embodiment, as noted hereinbefore, the client computer site 28 may also include the object finder terminal 22, which can function as a server computer and can be accessed by other computers at the client site 28 via a LAN. Each computer—the object finder computer 22 and the remote computer (not shown) at the client site 28—may include requisite data storage capability in the form of one or more volatile and non-volatile memory modules. The memory modules may include RAM (random access memory), ROM (read only memory) and HDD (hard disk drive) storage. Memory storage is desirable in view of sophisticated image processing and graphics display performed by the object finder terminal 22 as part of the object detection process.

Before discussing how the object detection process is performed by the object finder software 18, it is noted that the arrangement depicted in FIG. 2 may be used to provide a commercial, network-based object detection service that may perform customer-requested object detection in real time or near real time. For example, the object finder program 18 at the computer 22 may be configured to detect human faces in photographs or pictures remotely submitted to it over the communication network 30 (e.g., the Internet) by an operator at the client site 28. The client site 28 may be a photo processing facility specializing in removal of "red eyes" from photographs. In that case, the object finder computer 22 may first automatically detect all human faces in the photographs submitted and send the detection results to the client computer site 28, which can then automatically remove the red spots on the faces pointed out by the object finder program 18. Thus, the whole process can be automated. As another example, the object finder computer 22 may be a web server running the object finder software application 18. The client site 28 may be in the business of providing commercial image databases. The client site 28 may automatically search and index images on the world wide web as requested by its customers. The computer at the client site 28 may "surf" the web and automatically send a set of images or photographs to the object finder terminal 22 for further processing. The object finder computer 22, in turn, may process the received images or photographs and automatically generate a description of the content of each received image or photograph. The depth of image content analysis may depend on the capacity of the object finder software 18, i.e., the types of 3D objects (e.g., human faces, cars, trees, etc.) the object finder 18 is capable of detecting. The results of image analysis may then be transmitted back to the sender computer at the client site 28.

It is noted that the owner or operator of the object finder computer 22 may commercially offer a network-based object finding service, as illustrated by the arrangement in FIG. 3, to various individuals, corporations, or other facilities on a fixed-fee basis, on a per-operation basis or on any other payment plan mutually convenient to the service provider and the service recipient.

Figure 4:
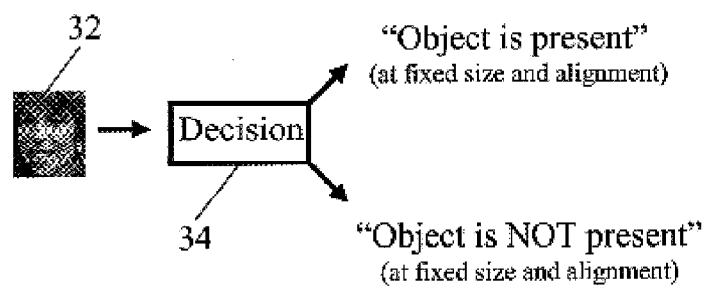
FIG. 4 illustrates the decision-making involving a fixed object size, orientation, and alignment.

FIG. 4 illustrates the decision-making involving a fixed object size, orientation, and alignment. The fixed size image input 32 is operated on by the decision maker, i.e., the object finder program 18, and a decision is made at block 34 whether the object is present in the image 32. The decision at block 34 is a binary one in the sense that the output of the object finder 18 represents only two values—either the object is present at fixed size and alignment or the object is not present at the given fixed size and alignment.

Figure 5:
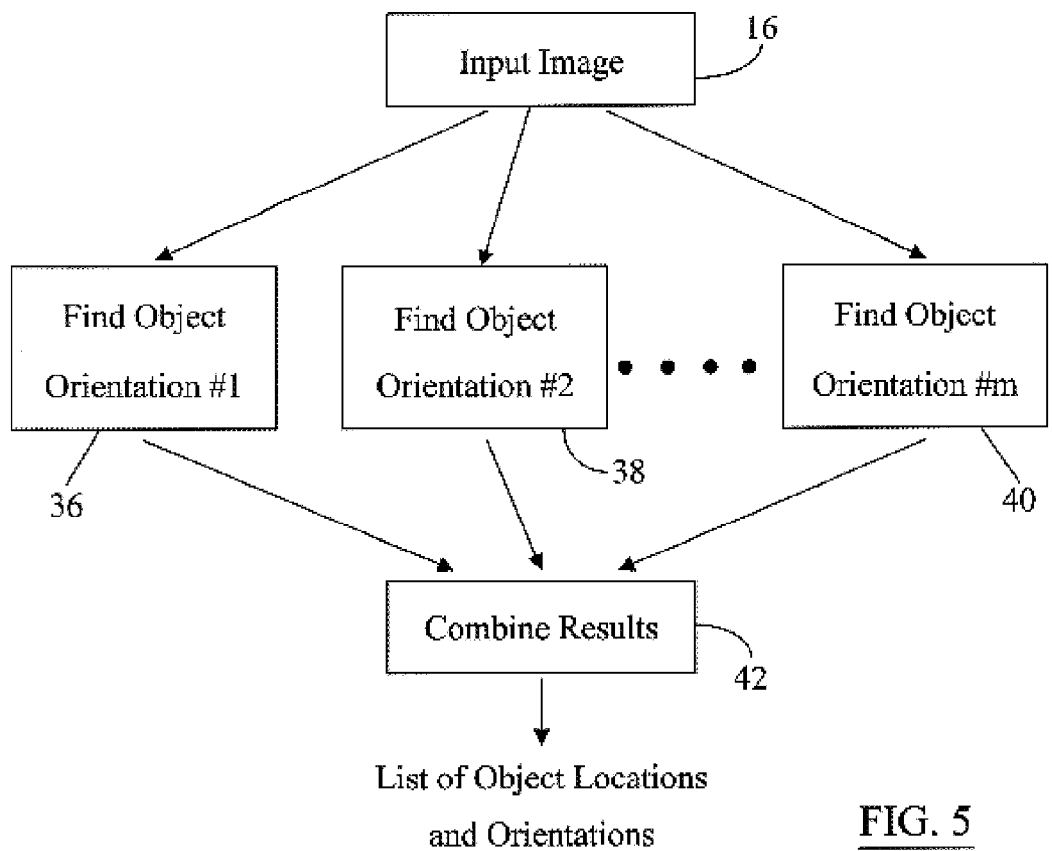
FIG. 5 shows the view-based classification approach utilized by the object finder program to detect object locations and orientations.

FIG. 5 shows the view-based classification approach utilized by the object finder program 18 to detect object locations and orientations. As noted hereinbefore, a challenge in object detection is the amount of variation in visual appearance, i.e., the variations in object shapes, sizes, colors, pose, etc. To cope with all this variation, the object finder 18 implements a two-part strategy for object detection. To cope with variation in pose (i.e., object position and orientation with respect to the camera), the object finder 18 uses a view-based approach with multiple detectors or classifiers (the terms "detectors" and "classifiers" are used interchangeably hereinbelow) that are each specialized to a specific orientation of the object as described and illustrated with respect to FIG. 6. Thereafter, the object finder 18 uses statistical modeling within each of these detectors to account for the remaining variation. Thus, a predetermined number of view-based detectors are applied in parallel to the input image 16 to find corresponding object orientations. In the embodiment illustrated in FIG. 5, there are "m" view-based classifiers, each classifier is trained to detect (as discussed in more detail hereinbelow) one orientation of a particular object (e.g., a human face). Thus, each detector detects its corresponding orientation 1, 2, 3, . . . , m, as represented by blocks 36, 38, and 40 in FIG. 5. The results of the detection are then combined at block 42. The combined output indicates specific 3D objects (e.g., human faces) present in the input 2D image.

It is noted that although the following discussion illustrates application of the object finder program 18 to detect human faces and cars in photographs or other images, that discussion is for illustrative purpose only. It can be easily evident to one of ordinary skilled in the art that the object finder program 18 of the present invention maybe trained or modified to detect different other objects (e.g., trees, faces of cats, helicopters, etc.) as well.

Figure 6:
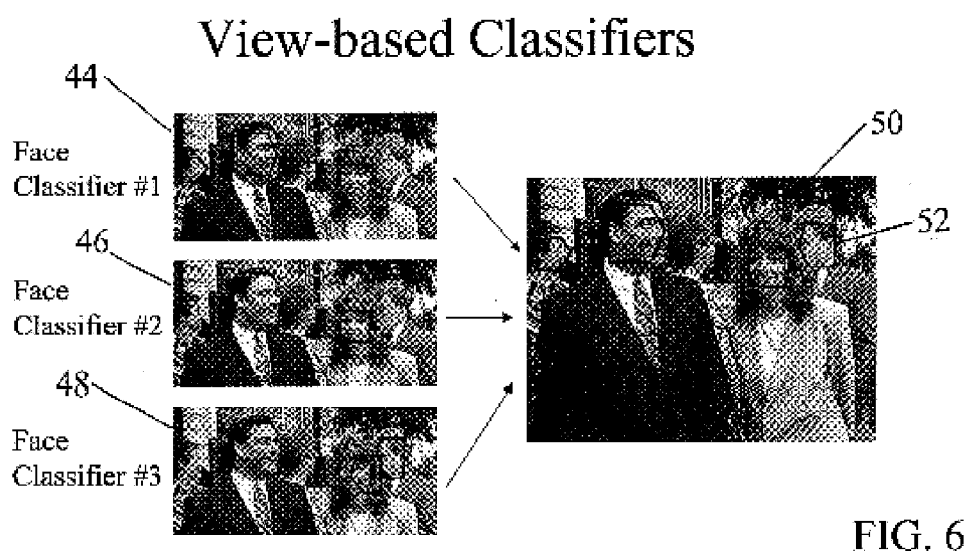
FIG. 6 is a real-life illustration of the object classification approach outlined in FIG. 5.

FIG. 6 is a real-life illustration of the object classification approach outlined in FIG. 5. As noted hereinbefore, each view-based detector or classifier is specialized to detect a specific orientation of a given object—i.e., the object (e.g., a human face, or a car) that the view-based detector is trained to detect. As illustrated in FIG. 6, for example, one detector may be specialized to detect right profile views of faces as shown by the object marker 52 (generated by the detector upon detecting the corresponding object orientation) in the picture slide 44. The picture slide 44 may thus represent the result obtained at block 36 in FIG. 5. Similarly, a different view-based detector may be specialized to detect frontal views as illustrated by the marked-up version of the picture slide 46 in FIG. 6 (corresponding, for example, to block 38 in FIG. 5). Finally, another detector may be configured to detect left profile views of human faces as illustrated by the marked-up version of the picture slide 48 in FIG. 6 (corresponding, for example, to block 40 in FIG. 5). Each picture slide shows object markers 52 placed at appropriate orientations of human faces detected by corresponding detectors. These view-based detectors are applied to the input image 16 in parallel and their results are then combined as shown by the final picture slide 50 in FIG. 6 (corresponding, for example, to the block 42 in FIG. 5). If there are multiple detections at the same or adjacent locations, the object finder 18 chooses the strongest detection. For example, in FIG. 6, picture slides 46 and 48 represent multiple detections (frontal face detection and left-hand side view detection) for the female face illustrated therein. In that event, the final combined output represents the strongest detection—i.e., the frontal face detection in slide 46. The object finder 18 thus finds orientations and locations of multiple objects (e.g., several human faces) in an image.

Figure 7:
FIG. 7 shows an example of different orientations for human faces and cars that the object finder program is configured to model.
Figure 7:
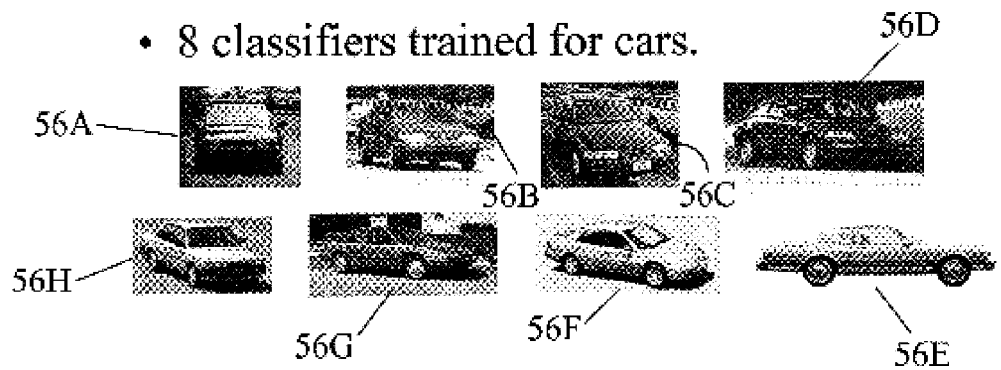

FIG. 7 shows an example of different orientations for human faces and cars that the object finder program 18 is configured to model. The number of orientations to model for each object (e.g., a human face or a car) may be empirically determined. In the embodiment illustrated in FIG. 7, two view-based detectors—frontal (54A) and right profile (54B)—are used to detect front and right profiles of human faces. To detect left-profile faces (as, for example, illustrated in the picture slide 48 in FIG. 6), the right profile detector 54B is applied to a mirror-reversed input image. For cars, eight detectors—one frontal detector 56A and seven right-side detectors 56B–56H—are used as shown in FIG. 7. Again, the left side views (of cars) are detected by running the seven right-side detectors (56B–56H) on mirror reversed images. It is noted that the numerals 54A–54B and 56A–56H are used hereinbelow to represent corresponding view-based detectors or classifiers for ease of description.

Figure 8:
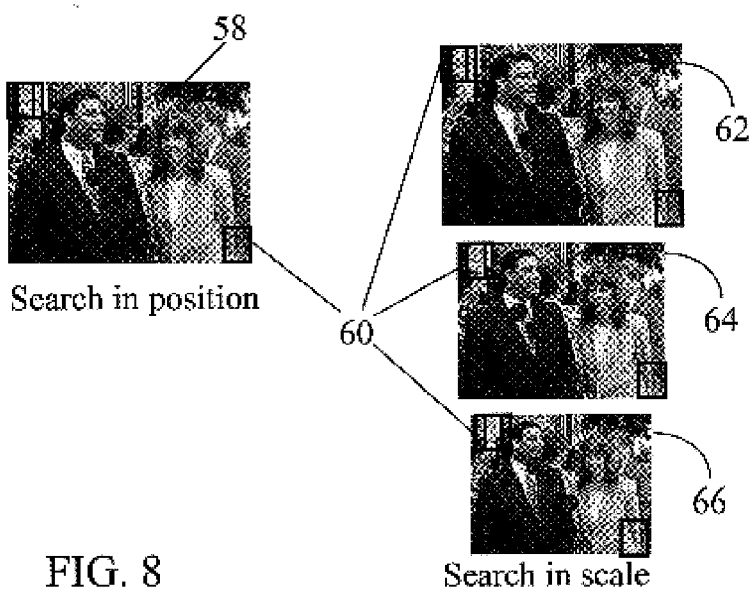
FIG. 8 depicts the general object detection approach used by the object finder program of the present invention.

FIG. 8 depicts the general object detection approach used by the object finder program of the present invention. Each view-based detector is not only specialized in detection of a specific orientation, but is trained to find the object only at a specified size within an image window, e.g., the rectangular image window 60. Therefore, to be able to detect the object at any position within an image, the detectors are first applied (in parallel) to the original image 58 for all possible (and, maybe overlapping) positions of this rectangular window as shown in FIG. 8. Then, to be able to detect the object at any size, the object finder program 18 iteratively resizes the input image and re-applies the detectors in the same fashion to each resized image 62, 64, and 66, as illustrated in FIG. 8. The illustrations in FIG. 8 show an exhaustive left-to-right, row-by-row scanning of the input image (and its scaled versions) using the rectangular window 60. It is noted that the size of the rectangular image window 60 remains fixed throughout the whole detection process. The size of the image window 60 maybe empirically selected based on a number of factors including, for example, desired accuracy or resolution, resulting computational complexity, efficiency of program execution, etc. In one embodiment, the size of the rectangular window is 64×64 pixels.

Functional Form of the Decision Rule

Prior to discussing detailed statistical computations performed by an embodiment of the object finder program 18, it is important to define the functional form of the decision rule used by the object finder 18 to detect the presence of a 3D object in a 2D image. For each view-based detector (e.g., detectors 54A–54B or 56A–56H in FIG. 7), statistical modeling is used to account for the remaining forms of variation within the orientation that the corresponding detector is trained to detect. Each of the detectors uses the same underlying form (i.e., equation (3) and its approximation equation (8) given hereinbelow) for the statistical decision rule. However, the detectors differ only in that they use statistics gathered from different sets of training images (discussed later hereinbelow).

A posterior probability function gives the probability that the object is present given an input image. Knowledge of this function is all that is necessary to perform object recognition. For a given input image region, x=image, the decision is made whether the object is present or absent based on which probability is larger, P(object|x) or P(non-object|x)=1−P(object|x), respectively. This choice is known as the maximum a posteriori (MAP) rule or the Bayes decision rule. Using this decision rule, optimal performance may be achieved, in the sense of minimum rate of classification errors, if the posterior probability function is accurate. It is noted that, in the discussion given herein, each random variable is indicated in italics. However, when a random variable assumes a specific value, that value is not italicized, e.g., x=image, where "x" represents a specific value of the random variable "image."

Unfortunately, it is not practically feasible to fully represent P(object|image) and achieve optimal performance; it is too large and complex a function to represent. It is therefore desirable to choose a simplified form of P(object|image) that can be reliably estimated using the available training data. Using Bayes theorem, one can decompose the posterior probability function into the class conditional probabilities for the object, P(image|object), and non-object, P(image|non-object), and the prior probabilities, P(object) and P(non-object) as given in equation (1) below:

$$P(\text{object} \mid \text{image}) = \frac{P(\text{image} \mid \text{object}) P(\text{object})}{P(\text{image})} \quad (1)$$

where the unconditional probability of the image, P(image), is given by:

$$P(\text{image}|\text{object})P(\text{object}) + P(\text{image}|\text{non-object})P(\text{non-object}) \quad (2)$$

The decomposition given in equation (2) allows separate estimation of each of the class-conditional probability functions, P(image|object) and P(image|non-object) from object and non-object training images, respectively. In the following discussion, it is explained how to further simplify the functional forms for these probabilities.

There are two statistical distributions that are modeled for each view-based detector—the statistics of the given object, P(image|object), and the statistics of the rest of the visual world, which is identified by the "non-object" class, P(image|non-object). Here, P(image|object) and P(image|non-object) are posterior probability functions for the random variable "image." Using Bayes theorem, Bayes decision rule in equation (1) can be re-written in an equivalent form as a likelihood ratio test. Thus, the object finder 18 computes the detection decision using the likelihood ratio test given in equation (3) below:

$$\frac{P(\text{image} \mid \text{object})}{P(\text{image} \mid \text{non-object})} > \lambda \quad (3)$$

$$\left( \lambda = \frac{P(\text{non-object})}{P(\text{object})} \right)$$

If the likelihood ratio (the left side in equation (3)) is greater than the right side, the object finder 18 decides that the object is present. Here, "λ" represents the ratio of prior probabilities (determined off-line as discussed later hereinbelow). Often, prior probabilities are difficult to determine, therefore, by writing the decision rule this way (i.e., as the equation (3)), all information concerning the prior is combined into one term "λ".

The term "λ" can be viewed as a threshold controlling the sensitivity of a view-based detector. There are two types of errors a detector can make. It can miss the object (a false negative) or it can mistake something else for the object (a false positive)(such as a cloud pattern for a human face). These two types of errors are not mutually exclusive. The "λ" controls the trade-off between these forms of error. Setting "λ" to a low value makes the detector more sensitive and reduces the number of false negatives, but increases the number of false positives. Conversely, increasing the value of "λ" reduces the number of false positives, but increases the number of false negatives. Therefore, depending on the needs of a given application, a designer can choose "λ" empirically to achieve a desirable compromise between the rates of false positives and false negatives.

It is noted that the likelihood ratio test given in equation (3) is equivalent to Bayes decision rule (i.e., the maximum a posteriori (MAP) decision rule) and will be optimal if the representations for P(image|object) and P(image|non-object) are accurate. The functional forms chosen to approximate these distributions are discussed hereinbelow.

Representation of Statistics Using Products of Histograms

The difficulty in modeling P(image|object) and P(image|non-object) is that the true statistical characteristics of appearance either for the object or for the rest of the world is not currently known or well understood by the scientific community. For example, it is not known if the true distributions for these probability functions are Gaussian, Poisson, or multimodal. These properties are unknown since it is not tractable to analyze the joint statistics of a large number of pixels. Because the true structure of these distributions is unknown, the safest approach may be to choose models that are flexible and can accommodate a wide range of structures. One class of flexible models are non-parametric memory-based models such as Parzen windows or nearest neighbor. The disadvantage of these models is that to compute a probability for a given input, that input may have to be compared to all the training data. Such a computation may be extremely time consuming. An alternative is to use a flexible parametric model that is capable of representing multimodal distributions, such as a multilayer perceptron neural network or a mixture model. However, there are no closed-form solutions for fitting these models to a set of training examples. All estimation methods for these models are susceptible to local minima.

Figure 9:
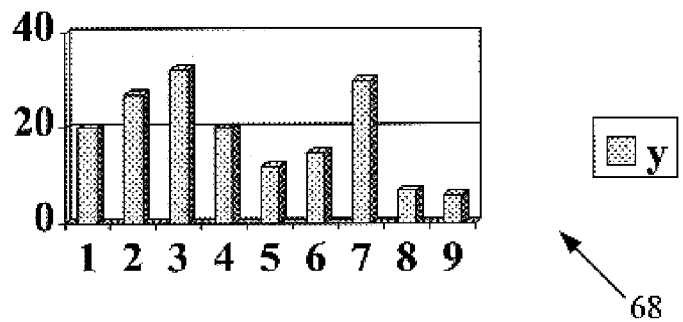
FIG. 9 illustrates an exemplary histogram.

Instead of the foregoing approaches, the object finder program 18 may use histograms. FIG. 9 illustrates an exemplary histogram 68. The histogram 68 shown in FIG. 9 is for illustrative purposes only. In actual operation, the set of histograms for the object finder program 18 may contain many more histograms with many different values. A histogram counts the frequency of occurrence of values of a given function. Each column in a histogram is called a "bin." The bin is a count of the number of times a specific value of the given function has occurred. Thus, for example, the bin for y=6 in FIG. 9 shows that the value y=6 has occurred 15 (fifteen) times. Histograms are almost as flexible as memory-based methods but use a more compact representation whereby a probability can be retrieved by a table look-up. Estimation of a histogram involves counting how often each attribute value occurs in the training data. The resulting estimates are statistically optimal. Furthermore, the resulting estimates are unbiased, consistent, and satisfy the Cramer-Rao lower bound.

However, the main drawback of a histogram is that only a relatively small number of discrete values can be used to describe appearance. To overcome this limitation, multiple histograms may be used where the probability distribution of each histogram, $P_k(\text{pattern}|\text{object})$, represents the probability of appearance over some specified visual attribute, $\text{pattern}_k$; that is, $\text{pattern}_k$ is a random variable describing some chosen visual characteristic such as, for example, low frequency content. To derive a probability distribution from a histogram, each count in each bin may be divided by the total number of counts in the entire histogram (see, for example, FIG. 18). How the object appearance is partitioned into different visual attributes is described later hereinbelow. However, in order to do the partitioning, it is desirable to first understand the issues in combining probabilities from different attributes.

To combine probabilities from different attributes, the following product (given by equation (4)) may be taken to approximate each class-conditional probability function as a product of histograms:

$$P(\text{image}|\text{object}) \approx \prod_k P_k(\text{pattern}_k|\text{object}) \quad (4)$$

$$P(\text{image}|\text{non-object}) \approx \prod_k P_k(\text{pattern}_k|\text{non-object})$$

In forming these representations for $P(\text{image}|\text{object})$ and $P(\text{image}|\text{non-object})$, it is implicitly assumed that the attributes ($\text{pattern}_k$) are statistically independent for both the object and the non-object. However, it can be shown that this assumption can be relaxed since the goal here is accurate classification not accurate probabilistic modeling as discussed in P. Domingos and M. Pazzani, "On the Optimality of the Simple Bayesian Classifier under Zero-One Loss", Machine Learning, 29, pp. 103–130, 1997. For example, consider a classification example based on two random variables, A and B. Assume that A is a deterministic function of B, $A=f(B)$, and is therefore fully dependent on A, i.e., $P(A=f(B)|B)=1$. Here, the optimal classifier becomes:

$$\frac{P(A, B|\text{object})}{P(A, B|\text{non-object})} = \qquad (5)$$

$$\frac{P(A|B, \text{object})P(B|\text{object})}{P(A|B, \text{non-object})P(B|\text{non-object})} = \frac{P(B|\text{object})}{P(B|\text{non-object})} > \lambda$$

If statistical independence between A and B is wrongly assumed, then the classifier becomes:

$$\frac{P(A, B|\text{object})}{P(A, B|\text{non-object})} \approx \frac{P(A|\text{object})P(B|\text{object})}{P(A|\text{non-object})P(B|\text{non-object})} = \qquad (6)$$

$$\left(\frac{P(B|\text{object})}{P(B|\text{non-object})}\right)^2 > \gamma$$

This case illustrates that accurate classification may be achieved (by choosing $\gamma=\lambda^2$) even though the statistical independence assumption has been violated.

In the general case, when the relationship between A and B is not known, performance of a detector may depend on how well the ratio $P(A|\text{object})/P(A|\text{non-object})$ approximates $P(A|B, \text{object})/P(A|B, \text{non-object})$. However, it may be better to model A and B as statistically independent than to model only one variable. For example, if model B is only modeled, the classifier would become:

$$\frac{P(A, B|\text{object})}{P(A, B|\text{non-object})} \approx (1)\frac{P(B|\text{object})}{P(B|\text{non-object})} \qquad (7)$$

In this formulation, the ratio $P(A|B, \text{object})/P(A|B, \text{non-object})$, would be implicitly approximated by 1. Chances are that $P(A|\text{object})/P(A|\text{non-object})$ is a better approximation of the ratio $P(A|B, \text{object})/P(A|B, \text{non-object})$.

In choosing how to decompose an object's visual appearance into different attributes, it may be desirable to determine what image measurements to model jointly and what to model independently. For example, if the joint relationship between two variables, such as A and B, seems to distinguish the object from the rest of the world, then the variables A and B should preferably be modeled jointly. If the software designer is unsure about the relationship between these variables, then it is still probably better to model the variables independently than not to model one at all.

Ideally, it is desirable to follow a systematic method for determining which visual qualities distinguish the object (to be detected) from the rest of the visual world. Unfortunately, the only known way of doing this is to try all possibilities and compare their classification accuracy. Such an approach may not be computationally tractable. Ultimately, it may be necessary to make educated guesses about what visual qualities distinguish the objects to be detected (e.g., faces and cars) from the rest of the world. These guesses are described below.

Decomposition of Appearance in Space, Frequency, and Orientation

For both faces and cars, the object finder 18 jointly models visual information that is localized in space, frequency, and orientation. To do so, visual appearance is decomposed along these dimensions. An embodiment of the decomposition process is explained below, and in the next section the visual attributes based on this decomposition are specified.

First, the appearance of the object (to be detected) is decomposed into "parts" whereby each visual attribute describes a spatially localized region on the object. Such decomposition concentrates the limited modeling power of each histogram over a smaller amount of visual information. It is preferred that these decomposed "parts" be suited to the size of the features on each object. However, since important cues for faces and cars occur at many sizes, multiple attributes over a range of scales may be needed. Such attributes may be defined by making a joint decomposition in both space and frequency. Since low frequencies exist only over large areas and high frequencies can exist over small areas, it is preferable to define attributes with large spatial extents to describe low frequencies and attributes with small spatial extents to describe high frequencies. Thus, the attributes that cover small spatial extents will be able to do so at high resolution. These attributes will capture small distinctive areas such as the eyes, nose, and mouth on a face and the grill, headlights, and tires on a car. On the other hand, the attributes defined over larger areas at lower resolution will also be able to capture other important cues. For example, on a human face, the forehead is brighter than the eye sockets, and, on a car, various surfaces such as the hood, windshield, and fenders may differ in intensity.

Some attributes may also be decomposed in orientation content. For example, an attribute that is specialized to describe horizontal features can devote greater representational power to horizontal features than if it also had to describe vertical features.

Finally, spatial decomposition of the object does not necessarily mean discarding all relationships between the various parts of the object. The spatial relationships of the parts may be an important cue for detection. For example, on a human face, the eyes, the nose, and the mouth appear in a fixed geometric configuration. To model these geometric relationships, the positions of each attribute sample are represented with respect to a coordinate frame (e.g., Cartesian co-ordinate axes x, and y) affixed to the object (and within each image window 60). This representation captures each sample's relative position with respect to all other samples. With this representation, each histogram now becomes a joint distribution of attribute and attribute position, $P_k(pattern_k(x,y), x, y|object)$ and $P_k(pattern_k(x,y), x, y|non-object)$, where attribute position, (x, y), is measured with respect to the rectangular image window 60 (FIG. 8) selected for classifying the image data. However, an attribute position is not represented at the original resolution of the image. Instead, the attribute position is represented at a coarser resolution to save on modeling cost and to implicitly accommodate small variations in the geometric arrangements of "parts" of the object.

Representation of Visual Attributes by Subsets of Quantized Wavelet Coefficients To create visual attributes that are localized in space, frequency, and orientation, it is desirable to be able to easily select information that is localized along these dimensions. In particular, it may be preferable to transform the image into a representation that is jointly localized in space, frequency, and orientation. For example, to do so, a wavelet transform of the entire input image may be performed.

The wavelet transform is not the only possible decomposition in space, frequency, and orientation. Both the short-term Fourier transform and pyramid algorithms can create such representations. Wavelets, however, produce no redundancy. An overcomplete wavelet transform may be shift invariant. On the other hand, some other transforms, e.g., the short-term Fourier transform, may not be critically-sampled transforms, and, hence, such transforms may not be shift invariant. The shift invariance property may be desirable when image resizing or scaling is to be performed as discussed hereinbelow. With a wavelet transform, unlike the other transforms mentioned hereinabove, one can perfectly reconstruct the image from its transform where the number of transform coefficients is equal to the original number of pixels (in the input image).

Figure 10:
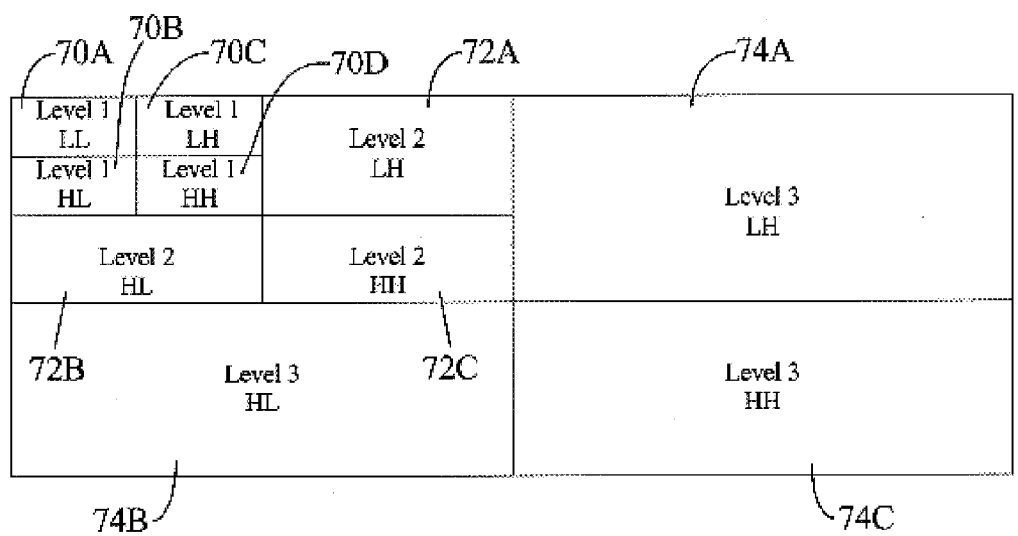
FIG. 10 shows a set of subbands produced by a wavelet transform based on a three-level decomposition of an input image using a 5/3 linear phase filter-bank.

FIG. 10 shows a set of subbands produced by a wavelet transform based on a 3 (three) level decomposition of an input image using a 5/3 linear phase filter-bank. It is noted, however, that many perfect or near-perfect reconstruction filter banks may be used to obtain equivalent performance as the 5/3 linear phase filter-bank. The 3-level decomposition using a 5/3 linear phase filter-bank may be implemented as discussed in G. Strang and T. Nguyen, "Wavelets and Filter Banks", Wellesley-Cambridge Press, 1997, the disclosure of which is incorporated herein by reference. The wavelet transform organizes the input image into subbands that are localized in orientation and frequency. For the embodiment illustrated in FIG. 10, the 5/3 linear phase filter-bank produces 10 (ten) subbands—four subbands 70A–70D at level-1, three subbands 72A–72C at level-2, and three subbands 74A–74C at level-3. Within each subband, each wavelet transform coefficient 80 (FIG. 11) is spatially localized.

Figure 11:
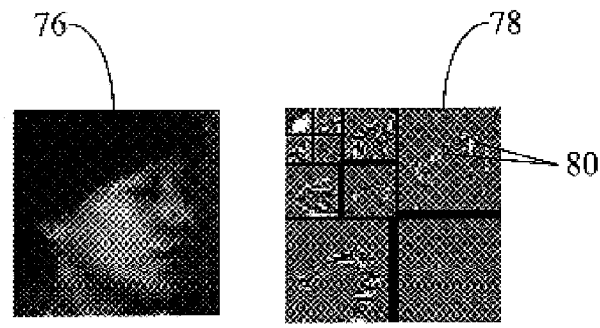
FIG. 11 depicts an input image and its wavelet transform representation.

FIG. 11 depicts an input image 76 and its wavelet transform representation 78. Ten subbands are visible on the wavelet decomposition 78. The wavelet transform coefficients 80 are also shown in FIG. 11. The coefficients 80, as discussed above, are spatially localized within appropriate subbands. It is noted that each level in a wavelet transform represents a higher octave of frequencies. Thus, a coefficient in level-1 (i.e., subbands 70A–70D) describes 4 (four) times the area of a coefficient in level-2 (i.e., subbands 72A–72C). Similarly, a coefficient in level-2 describes 4 (four) times the area of a coefficient in level-3 (i.e., subbands 74A–74C). In other words, the wavelet representation 78 shows a gradation of details (of the input image) with level-1 coefficients representing coarse details, level-2 coefficients representing intermediate details, and level-3 coefficients representing fine image details as shown in FIG. 12.

FIG. 13 shows three vertical subbands 82 and three horizontal subbands 84 in the wavelet decomposition 78. It is noted that in terms of orientation, LH (in FIG. 10) denotes low-pass filtering in the horizontal direction and high-pass filtering in the vertical direction, i.e., representation of horizontal features, such as, for example, human lips, eyelids, etc. Similarly, HL (in FIG. 10) may denote high-pass filtering in the horizontal detection and low-pass filtering in the vertical direction, i.e., representation of vertical features, such as, for example, a human nose. Thus, vertical subbands 82 may be considered as representing horizontal features, whereas the horizontal subbands 84 may be considered as representing vertical features of the object. Finally, HH may denote high-pass filtering in both horizontal and vertical directions, and LL may denote low-pass filtering in both horizontal and vertical directions.

The subband-based wavelet representation 78 may be used as a basis for specifying visual attributes that the object finder 18 may evaluate (as discussed later hereinbelow) to detect the object. Each visual attribute may be defined to sample a moving window of transform coefficients. For example, one attribute could be defined to represent a 3×3 window of coefficients in the level-3 LH band. This attribute would then capture high frequency horizontal patterns over a small extent (because of the smaller area represented by level-3) in the original image—a fine representation as depicted in FIG. 12. Another set of patterns or attributes could represent spatially registered 2×2 blocks of coefficients in the LH and HL bands of the 2nd level. This set of attributes may represent an intermediate frequency band (as shown in FIG. 12) over a larger spatial extent in the image.

Since each attribute must only take on a finite number of values, the attribute may be defined to compute a vector quantization of wavelet coefficients sampled by the attribute. In one embodiment, to keep the histogram size under 1,000,000 bins for each attribute, each attribute may need to be expressed by no more than 10,000 discrete values since each attribute positions (x,y) may together take on about 100 discrete values. To stay within this limit, each visual attribute may be defined to sample a predetermined number (here, 8 (eight)) wavelet coefficients at a time and may quantize each coefficient to 3 (three) levels. The number of coefficients to be sampled and the number of levels of quantization may be heuristically determined. In alternative embodiments, each attribute may sample more or less than eight wavelet coefficients and may quantize those coefficients to more or less than three levels depending on, for example, the desired accuracy of detection and allowable computational complexity. The three-level quantization scheme for eight wavelet coefficients thus gives $3^8=6,561$ (<10,000) discrete values for each visual attribute.

In one embodiment, the object finder 18 uses 17 (seventeen) attributes that sample the wavelet transform of the entire input image in groups of 8 coefficients in one of the following ways as defined in P. C. Cosman, R. M. Gray, and M. Vetterli, "Vector Quantization of Image Subbands: A Survey", IEEE Transactions on Image Processing, 5:2, pp. 202–225, February, 1996, the disclosure of which is incorporated herein by reference. The seventeen attributes are divided as follows: seven intra-subband operators, three inter-orientation operators, six inter-frequency operators, and one inter-frequency/inter-orientation operator.

1. Intra-subband operators (or attributes)—Here, all the coefficients (for an attribute) come from the same subband. These visual attributes are the most localized in frequency and orientation. FIG. 14 shows seven intra-subband operators 85–96. In the embodiment illustrated in FIG. 14, the seven attributes are defined for the following subbands: the attribute $f_1(i,j)$ 85 defined for the level-1 LL subband 70A (FIG. 10), the attribute $f_2(i,j)$ 88 defined for the level-1 LH subband, the attribute $f_3(i,j)$ 86 defined for the level-1 HL subband, the attribute $f_4(i,j)$ 92 defined for the level-2 LH subband, the attribute $f_5(i,j)$ 90 defined for the level-2 HL subband, the attribute $f_6(i,j)$ 96 defined for the level-3 LH subband, and the attribute $f_7(i,j)$ 94 defined for the level-3 HL subband. It is noted that the attributes or operators are denoted in the drawings by the symbol "$f_k(i,j)$" instead of "$\text{pattern}_k(x,y)$" for the sake of simplicity and brevity only. The two terms are identical and used interchangeably throughout the discussion.

Figure 15:
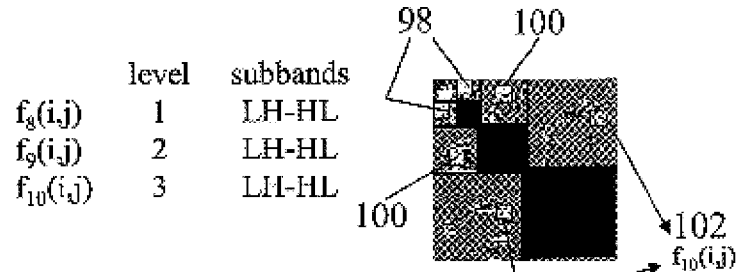
FIG. 15 shows three inter-orientation operators.

2. Inter-orientation operators—FIG. 15 shows three inter-orientation operators 98, 100, and 102. Here, the coefficients come from the same frequency band but multiple orientation bands. The attributes shown in FIG. 15 can represent cues that have both horizontal and vertical components, such as, for example, corners in an object. In the embodiment illustrated in FIG. 15, three (3) such attributes are defined using the following subband pairs: the attribute $f_8(i,j)$ 98 is defined for the level-1 LH–level-1 HL subband pair, the attribute $f_9(i,j)$ 100 is defined for the level-2 LH–level-2 HL subband pair, and the attribute $f_{10}(i,j)$ 102 is defined for the level-3 LH–level-3 HL subband pair.

Figure 16:
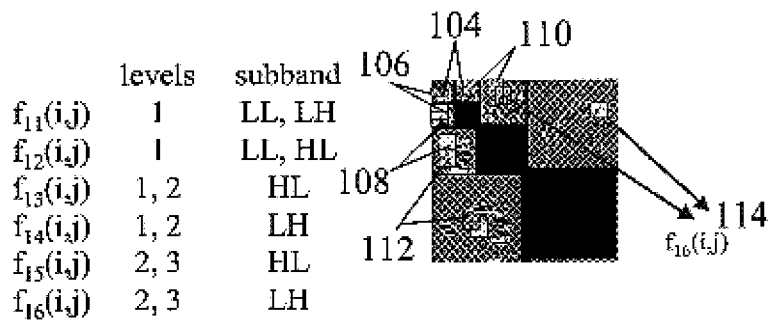
FIG. 16 shows six inter-frequency operators.

3. Inter-frequency operators—FIG. 16 shows six inter-frequency operators 104–114. Here, the coefficients come from the same orientation but multiple frequency bands. The attributes shown in FIG. 16 represent visual cues that span a range of frequencies, such as, for example, edges of an object. In the embodiment illustrated in FIG. 16, six (6) such attributes are defined using the following subband pairs: the attribute $f_{11}(i,j)$ 104 is defined for the level-1 LL–level-1 LH subband pair, the attribute $f_{12}(i,j)$ 106 is defined for the level-1 LL–level-1 HL subband pair, the attribute $f_{13}(i,j)$ 108 is defined for the level-1 HL–level-2 HL subband pair, the attribute $f_{14}(i,j)$ 110 is defined for the level-1 LH–level-2 LH subband pair, the attribute $f_{15}(i,j)$ 112 is defined for the level-2 HL–level-3 HL subband pair, and the attribute $f_{16}(i,j)$ 114 is defined for the level-2 LH–level-3 LH subband pair.

Figure 17:
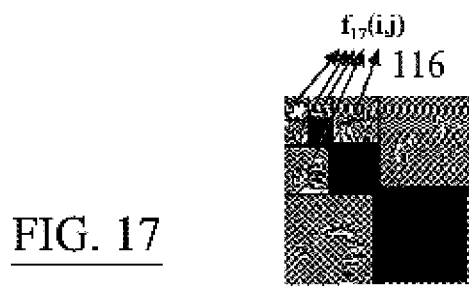
FIG. 17 shows one inter-frequency, inter-orientation operator.

4. Inter-frequency/inter-orientation operators—The combination of inter-frequency, inter-orientation operators is designed to represent cues that span a range of frequencies and orientations. FIG. 17 shows one inter-frequency, inter-orientation operator 116. In the embodiment illustrated in FIG. 17, one such inter-frequency, inter-orientation attribute $f_{17}(i,j)$ 116 is defined by combining the coefficients from the following subbands: level-1 LL subband, level-1 LH subband, level-1 HL subband, level-2 LH subband, and level-2 HL subband.

In terms of spatial-frequency decomposition, attributes that use level-1 coefficients describe large spatial extents over a small range of low frequencies, attributes that use level-2 coefficients describe mid-sized spatial extents over a mid-range of frequencies, and attributes that use level-3 coefficients describe small spatial extents over a large range of high frequencies.

Final Form of each Detector

The approach used by each detector or classifier 54A–54B, 56A–56H (FIG. 7) is to sample each attribute at regularly-spaced intervals with partial overlap within the image window 60 and across the entire extent of the image window 60. Such an approach allows use of as much visual information as possible in making a detection decision. For example, salient features such as the eyes and the nose will be very important for face detection, whereas other areas such as the cheeks and the chin will also help, but perhaps to a lesser extent. Thus, the final form of each detector is given by:

$$\frac{\prod_{x,y \in \text{region}} \prod_{k=1}^{17} P_k(\text{pattern}_k(x,y), x, y \mid \text{object})}{\prod_{x,y \in \text{region}} \prod_{k=1}^{17} P_k(\text{pattern}_k(x,y), x, y \mid \text{non-object})} \quad (8)$$

where k=1 through 17 represent the seventeen attributes $\text{pattern}_k(x,y)$ or $f_k(i,j)$ described hereinabove, and the "region" is the image window 60 for classifying the input image. Alternatively, the detector can be equivalently evaluated by taking the logarithm of equation (8), as given below in equation (8A).

$$\sum_{k=1}^{17} \sum_{x,y \in \text{region}} \log \left[ \frac{P_k(\text{pattern}_k(x, y), x, y \mid \text{object})}{P_k(\text{pattern}_k(x, y), x, y \mid \text{non-object})} \right] > \log \lambda \quad (8A)$$

$$\sum_{k=1}^{17} \sum_{x,y \in \text{region}} LLT(\text{pattern}_k(x, y), x, y) > \log \lambda$$

In equation (8A), "LLT" stands for "log-likelihood table".

Thus, equation (8) expresses the decision rule in terms of the class-conditional probabilities, whereas equation (8A) is an equivalent form of the decision rule expressed by taking the logarithm of both sides of equation (8). By taking a logarithm, the products in equation (8) may be expressed as sums as shown in equation (8A). In equation (8A), each $$\log \left[ \frac{P_k(\text{pattern}_k(x, y), x, y \mid \text{object})}{P_k(\text{pattern}_k(x, y), x, y \mid \text{non-object})} \right]$$

term can be represented by one number. That is, rather than representing $P_k(\text{pattern}_k(x,y), x, y|\text{object})$ and $P_k(\text{pattern}_k(x,y), x, y|\text{non-object})$ by separate tables each indexed by the triplet: $(\text{pattern}_k(x,y), x, y)$, it is preferable to pre-compute the logarithm of their ratio and store it in one table indexed by $(\text{pattern}_k(x,y), x, y)$. Such a table is referred to herein as the "log-likelihood table" (LLT). In practice, during detection, the logarithm of equation (8) may be determined by looking-up the appropriate log-likelihood tables for each visual attribute. By doing so, computational cost may be saved in two ways. First, for each triplet $(\text{pattern}_k(x,y), x, y)$, only one value needs to be retrieved from the memory instead of two values. Second, the retrieved numbers need only be added rather than multiplied (as in equation (8)). As addition is typically faster than multiplication on almost all computers, a significant savings in computational time may be achieved. Thus, in the log-likelihood form, the decision can be computed by taking a sum rather than a product and can be computed by making half as many table look-ups.

Collection of Statistics

Equation (8) (or, equation (8A)) only specified the form of the detector. Prior to performing detection on an unknown image, one needs to collect the actual histograms for $P_k(\text{pattern}_k(x,y), x, y|\text{object})$ and $P_k(\text{pattern}_k(x,y), x, y|\text{non-object})$ so as to enable the object finder 18 to perform the object detection. The histogram collection process is described hereinbelow with reference to FIGS. 18–22. In gathering statistics, one of the immediate problems is choosing training examples for the class "non-object." Conceptually, this class represents the visual appearance of everything in the world excluding the object to be classified. To represent this class accurately, it may be needed to collect an extremely large set of images. However, since the goal is classification and not accurate representation, one may not necessarily need a representative set of "non-object" images. In order to achieve accurate classification it is more important to use non-object samples that are most likely to be mistaken for the object to be detected (e.g., a human face or a car) as discussed in B. D. Ripley, *Pattern Recognition and Neural Networks*, Cambridge University Press, 1996. This concept is similar to the way support vector machines work by selecting samples near the decision boundary as discussed in V. N. Vapnik, *The Nature of Statistical Learning Theory*, Sprinter, 1995. The disclosures of both of these publications are incorporated herein by reference in their entireties.

To determine such samples (i.e., non-object samples that are most likely to be mistaken for the object) a method called bootstrapping may be used. In bootstrapping, a preliminary detector is trained by estimating $P_k(\text{pattern}_k(x,y), x, y|\text{non-object})$ using randomly drawn samples from a set of non-object images. This preliminary detector is then run over a set of about 2,500 images that do not contain the object. Additional non-object samples are then selected at those locations that gave high response within this image collection. These non-object samples are then combined with the original non-object samples to form a larger set of non-object samples. Similarly, $P_k(\text{pattern}_k(x,y), x, y|\text{object})$ is collected from images of the object (e.g., human faces or cars). In one embodiment, for each face viewpoint, about 2,000 original images are used; and for each car viewpoint, between 300 and 500 original images are used. Each of these training images is sized, aligned, and rotated to give the best correspondence with a prototype representing the image class (e.g., frontal faces). For each original image, approximately 400 synthetic variations are also generated by altering background scenery and making small changes in aspect ratio, orientation, frequency content, and position. It is noted that increasing the number of original images and synthetic variations will increase the time required to train the detector but may also increase the accuracy of the detector. The number of original training images may be determined by the desired accuracy of detection, the availability of suitable training images, and limitations on the amount of time and computer resources that can be devoted to training.

Statistics for the training examples may be collected using several approaches. In one approach, all the training examples may be given equal weight and each histogram may be estimated separately. Such an approach may be used in one embodiment for estimating the car detectors. However, the disadvantage of this approach is that it does not explicitly minimize classification error on the training set. For the face detectors, the one embodiment classification error is minimized over the training set, by using the AdaBoost algorithm discussed in Y. Freund, R. E. Shapire, "A Decision-Theoretic Generalization of On-Line Learning and an Application to Boosting", Journal of Computer and System Sciences, 55:1, pp. 119–139, 1997 (hereafter "Freund & Shapire"), in R. E. Shapire, Y. Singer, "Improving Boosting Algorithms Using Confidence-rated Predictions", Machine Learning, 37:3, pp. 297–336, December, 1999 (hereafter, "Shapire & Singer"), and in L. Breiman, "Arcing Classifiers", The Annals of Statistics, 26:3, pp. 801–849, 1998 (hereafter "Breiman"). The disclosures of these three publications are incorporated herein by reference in their entireties.

Figure 18:
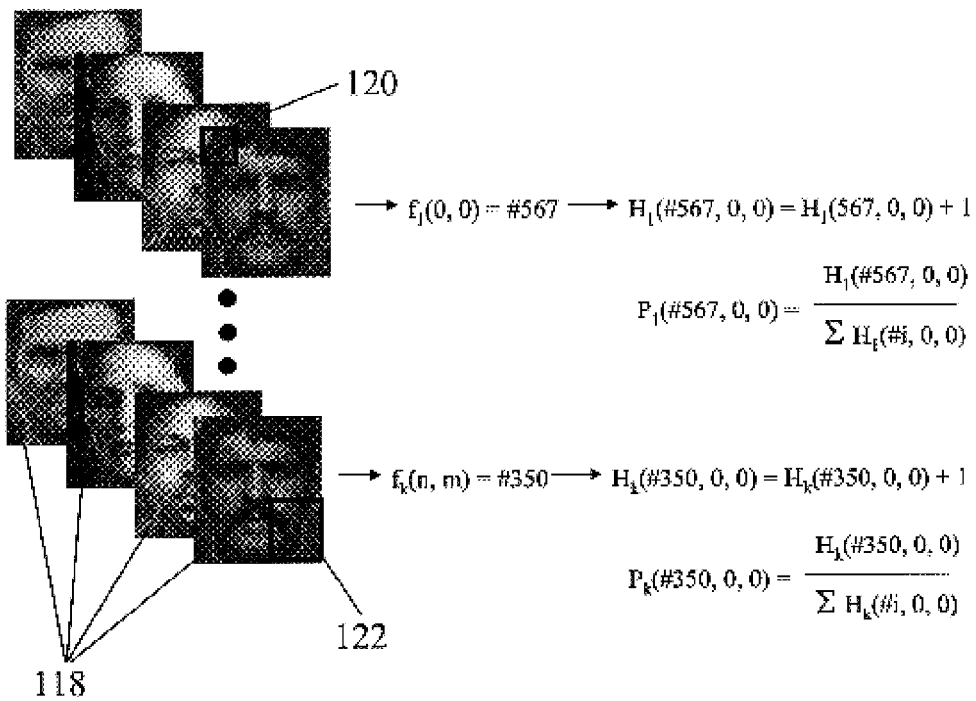
FIG. 18 illustrates an example of how statistics for detectors are collected off-line using a set of training images.

FIG. 18 illustrates an example of how statistics for detectors are collected off-line using a set of training images 118. FIGS. 19–22 illustrate how detectors are estimated using the AdaBoost algorithm. The discussion below is with reference to FIGS. 18–22. It is noted that although FIG. 18 shows human faces constituting the set of training images 118, the method outlined in FIG. 18 (and in FIGS. 19–22 as well) can also be used to collect statistics for training images of any object including, for example, cars, trees, cats, etc. As shown in FIG. 18, a discrete value (based on the quantization of 8 wavelet coefficients for corresponding image region) is computed for each visual attribute $f_k(i,j)$ or $\text{pattern}_k(x,y)$ for different positions (x,y) or (i,j) within the image window (not shown in FIG. 18). It is noted that, because of quantization, there may be more than one combination of 8 wavelet coefficient values producing the same discrete value. In FIG. 18, attribute $f_1(0,0)$ takes the value "567" at location (0,0) in the corresponding image window (not shown), whereas the attribute $f_k(n,m)$ takes the value "350" at coordinate locations (n,m) in the corresponding image window (not shown). In the embodiment illustrated in FIG. 18, there are seventeen attributes, and, hence, the variable "k" takes on values from 1 through 17 as discussed hereinbefore. FIG. 18 also illustrates the regions on the image "covered" by the corresponding attributes. The attribute $f_1(0,0)$ is shown to represent a smaller image area 120, whereas the attribute $f_k(n,m)$ is shown to represent a larger image area 122. It has already been discussed hereinbefore how different attributes represent larger or smaller areas on the image.

Histograms are collected by counting the number of occurrences of each attribute value across the set of training images. Then, a table of probabilities is generated for each attribute from the histogram of that attribute as shown in FIG. 18. Each probability value in the table corresponds to a bin in the respective histogram. For example, for attribute '$f_1$', to compute the probability of pattern value "567" occurring at location (0,0), the bin count $H_1(\#567,0,0)$ is divided by the count of all bins that correspond to the location (0,0) for histogram $H_1$ (i.e., $\Sigma H_1(\#i, 0,0)$). Other probabilities may be similarly calculated.

A log-likelihood table (LLT) is computed corresponding to each pair of histograms (object and non-object) corresponding to each attribute as noted hereinbefore. To compute this log-likelihood table, corresponding entries in each probability table are retrieved. For example, in each probability distribution, there may be entries for pattern value "567" at location (0,0). These two values are then reduced to one value by taking their ratio (object probability divided by non-object probability). The logarithm of this ratio is then taken and the result becomes the entry in location (#567,0,0) in the log-likelihood table.

For each view-based detector (for example, the two detectors for human faces and the eight detectors for cars as noted hereinbefore), the AdaBoost algorithm may be used as a method for refining the values computed in the log-likelihood tables for each attribute. The AdaBoost algorithm is a general method for training pattern classifiers. Its chief advantage is that it minimizes the classification error on the training set and maximizes the margin between the two classes on the training set as discussed in Freund & Shapire, Shapire & Singer, and Breiman. AdaBoost is a general method that can be applied to any type of classification algorithm. AdaBoost works by training multiple instances of a "base" classifier where each base classifier corresponds to a different set of values for the look-up table comprising equation (8A). To perform classification, AdaBoost applies all of such instances of a "base" classifier in combination and computes the weighted sum of their output to make a classification decision. A disadvantage of this approach is the increased computational cost of applying all the classifiers in the combination. The following describes a process for computing a single look-up table for a single classifier using AdaBoost.

Figure 19:
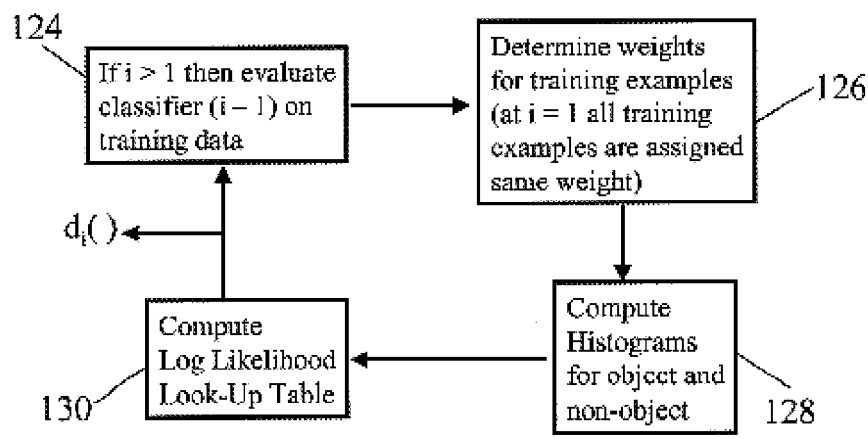
FIGS. 19–22 illustrate how detectors are estimated using the AdaBoost algorithm.

As shown in FIG. 19, the AdaBoost algorithm works in an iterative fashion. First, a detector (or classifier) is trained by assigning the same weight to all training examples (e.g., images 118 in FIG. 18) at the instance i=1 for that detector. For each i>1 (where i=1 . . . p, and where "p" represents a predetermined number of instances for the "base" classifier being trained), the $(i-1)^{th}$ instance is evaluated on the training data (block 124). (Currently, there are no rigorous theoretical guidelines on how to choose "p." Experimentally, a value of as little as "5" can lead to improvement and values as large as "100" can lead to further improvement. In the preferred embodiment, the values for "p" are in the range of 15 to 20.) Then, the detector is iteratively retrained where, at each iteration, more weight is given to training examples that were incorrectly classified by the detector trained in the previous iteration (block 126). It is shown in Freund & Shapire and in Shapire & Singer that through this iteration process the classification error can be decreased. The AdaBoost algorithm then computes histograms for object and non-object training samples (block 128) using the weights determined at block 126.

Figure 21:
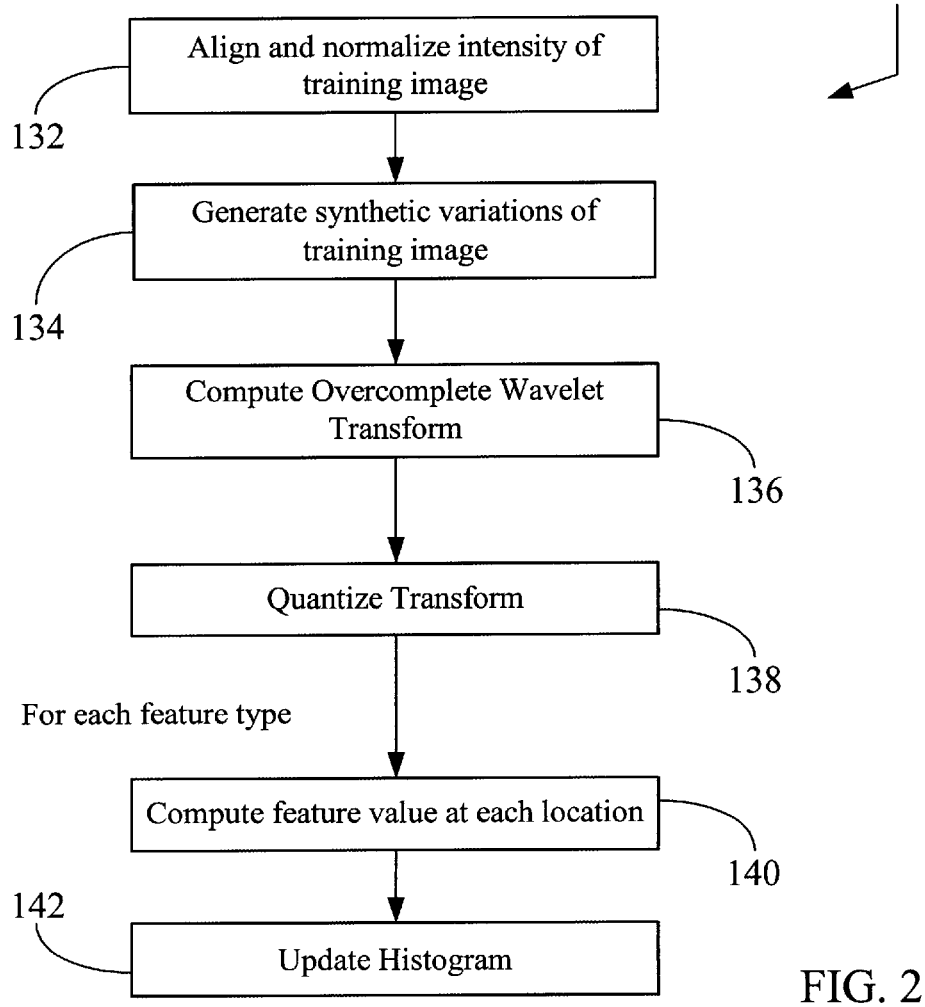
Figure 22:
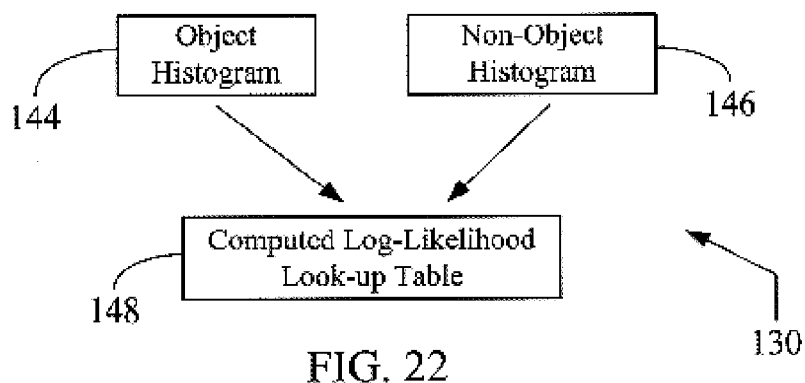

FIG. 21 illustrates an embodiment how histograms are computed for object and non-object training samples. It is noted that AdaBoost computes such object histograms separately from the non-object histograms. Initially, the input training image is sized and aligned with a prototype representing its category and its intensity is normalized (block 132), and a suitable number of synthetic variations of the input image are generated (block 134) prior to computing the overcomplete wavelet transform for the image (block 136). The method of computing the overcomplete wavelet transform is described hereinbelow with reference to FIG. 23. It is noted that the intensity normalization is discussed hereinbelow with reference to the discussion of both the detector training process and the actual detection process. Such intensity normalization may be accomplished (at each image scale) prior to computation of the corresponding overcomplete wavelet transform of the image (see FIG. 23).

The intensity normalization process may be implemented to cope with different levels of lighting. For example, a photograph may be taken under very dim light or under very bright light. An embodiment of the present invention uses the following mechanism to adjust for these differences in lighting. This method is called "intensity normalization." It is desirable to find correction factors, "$c_1$" and "$c_2$", that correct the intensity level on the left and right halves of the object respectively. The correction factors "$c_1$" and "$c_2$" are determined independently of each other. The training and testing processes may use different methods to determine "$c_1$" and "$c_2$". In training, for each training image, a human operator may choose by hand the appropriate value of $c_1$ and $c_2$ (from a choice of 5 (five) possible values for each) by examining the effect each value has on the appearance of the image. During detection, it may be preferable to evaluate the total log-likelihood (as given in equations 8 or 8A) separately for each half of each image window 60 separately at 5 (five) different values for $c_1$ and $c_2$ respectively. For each half, a selection among the 5 values for the total log-likelihood is made and the largest is chosen. By doing so, values for $c_1$ and $c_2$ are implicitly chosen. These two largest values (one for the left half and one for the right half of the image window 60) are then added to get the overall log-likelihood for the object.

Referring back to FIG. 21, after computation of the overcomplete wavelet transform at block 136, the transform coefficients are then quantized (block 138) and, for each feature type (here, there are seventeen different features or visual attributes as discussed hereinbefore), a feature value ($pattern_k(x,y)$) (e.g., values "567" and "350" in FIG. 18) is computed first (block 140) and the corresponding histogram is then updated at block 142 as illustrated in more detail in FIG. 18. The whole process (i.e., blocks 132 through 142) is repeated for each training image—object and non-object.

After computing appropriate histograms for each feature type, a log-likelihood look-up table ($d_i(y)$) is computed (block 130) for the $i^{th}$ instance of the "base" classifier. (For the sake of simplicity, the AdaBoost algorithm is illustrated herein for a log-likelihood table, $d_i(y)$, indexed by one value, y, whereas in actuality the log-likelihood table is indexed by the triplet of values—(pattern$_k$(x,y), x, y)—representing pattern value, pattern$_k$(x,y) (where k=1 through 17, and pattern position, (x,y), of an attribute.) A log-likelihood table converts the products in equation (8) into corresponding sums (one for the numerator and one for the denominator in equation (8)) as discussed hereinbelow with reference to FIG. 22. At each iteration of the AdaBoost algorithm, a new look-up table $d_i(y)$ is computed using a different weighting of the training data; that is, the relative influences of each individual training example is modified as discussed in Freund & Shapire, Shapire & Singer, and Breiman. The symbol "$d_i(y)$" represents a look-up table generated at the $i^{th}$ instance of training the "base" classifier. Normally, under AdaBoost, to perform classification, for each input attribute value, $y_j$, one would have to look up values for $y_j$ in all the look-up tables, $d_i(y)$, for i=1 . . . p, and then compute the weighted sum of these values, where the weights are given by $a_i$:

$$h(I) = \sum_i a_i \sum_{j \in I} d_i(y_j) \quad (9)$$

where "I" represents one image window.

Figure 20:
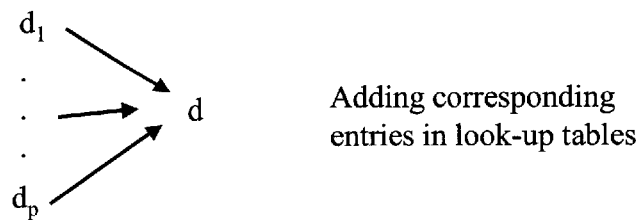

However, in the present invention, a mathematically equivalent result as in equation (9) is obtained at a much less computational cost by pre-computing one look-up table, d(y), whose entries are the weighted sums of the corresponding entries of $d_i(y)$, for i=1 . . . p, as shown in FIG. 20 and as given by the following equation, for one entry, y:

$$d(y) = \sum_i a_i d_i(y) \quad (10)$$

Using d(y), for each input attribute value, the object finder 18 then only has to look-up one value $d(y_j)$ instead of 'p' values—one each for i=1 . . . p as required by equation (9).

Using this approach, during detection, the following computation is used, which is mathematically equivalent to equation (9) but at a reduction in computation by a factor of "p":

$$h(I) = \sum_{j \in I} d(y_j) \quad (11)$$

The equation (11) thus represents the products in equation (8) as a sum. The conversion of products into a sum may be achieved by taking the logarithm of the left-hand side of equation (8). Therefore, the term "log-likelihood table" is used in FIGS. 19 and 22. The histograms for the object (block 144) and non-object (block 146) are computed separately and then combined to generate the log-likelihood look-up tables used by AdaBoost which then generates the final log-likelihood look-up tables (block 148) for the object finder program 18 to refer to as discussed hereinbelow with reference to FIG. 23.

Implementation of Detectors: Coarse-to-Fine Search

Figure 24:
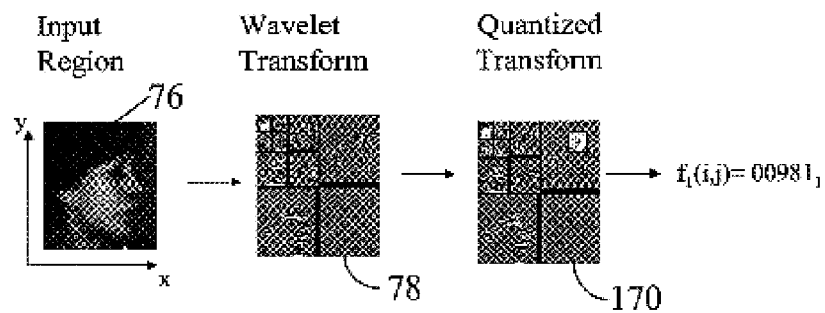
FIG. 24 illustrates an input image along with its wavelet transform and quantized wavelet transform.
Figure 25:
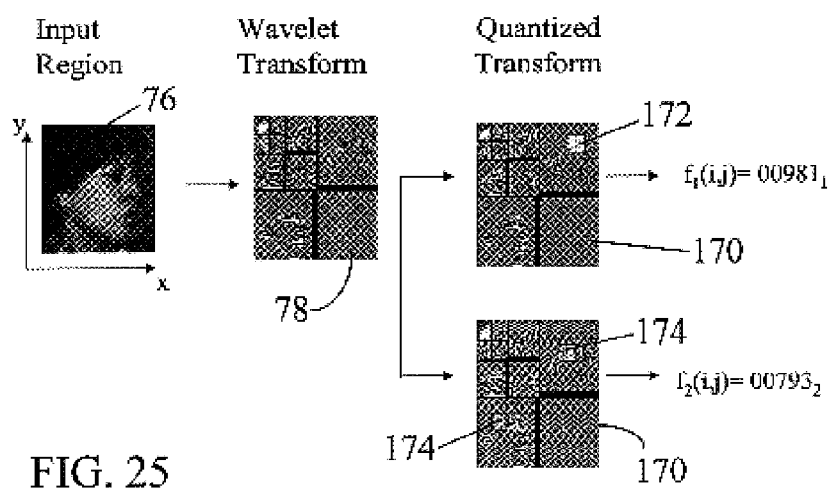
FIG. 25 illustrates how two local operators sample different arrangements of wavelet coefficients.
Figure 23:
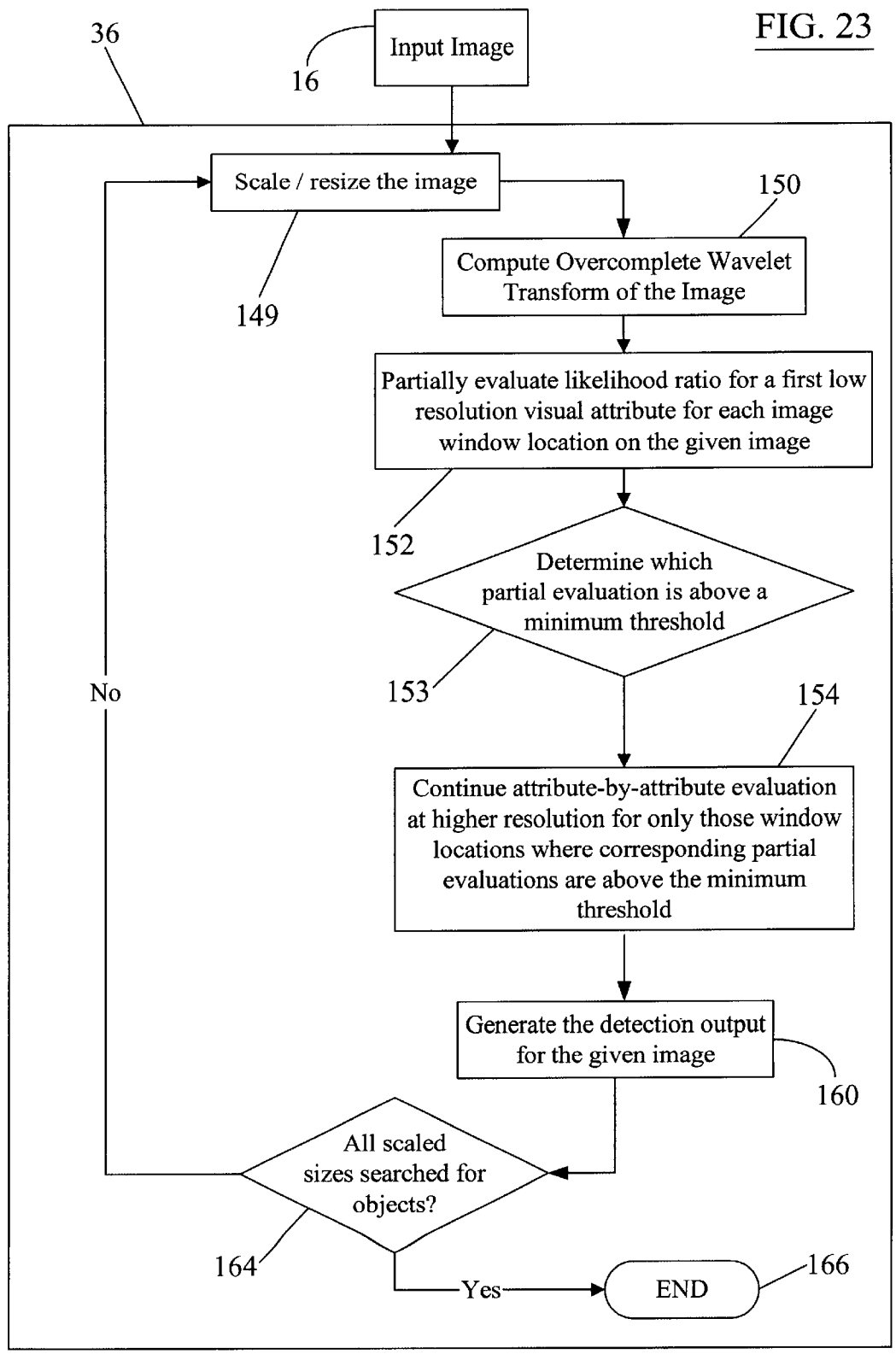
FIG. 23 shows a simplified flow chart illustrating major operations performed by a view-based detector during detection of an object at a specific orientation.

FIG. 23 shows a simplified flow chart illustrating major operations performed by a view-based detector (e.g., any of the detectors 54A–54B or 56A–56H in FIG. 7) during detection of an object at a specific orientation. FIG. 23 illustrates the flow chart for the object orientation given by block 36 in FIG. 5. However, the flow chart equally applies to detections of all different orientations (e.g., blocks 38 and 40) illustrated in FIG. 5. Each detector operates in parallel on the input image 16. First, for a given image size (block 149, discussed later hereinbelow with reference to FIGS. 31 and 32) an overcomplete wavelet transform of the input image is computed and corresponding quantized coefficients are generated therefrom by the respective detector (block 150). FIG. 24 illustrates an input image 76 along with its wavelet transform 78 and quantized wavelet transform 170. It is noted that the input image 76 must be at least the size of the image window 60. FIG. 24 also shows an equation representing how a visual attribute, $f_1(i,j)$, samples a set of quantized wavelet coefficients. FIG. 25, on the other hand, illustrates how two local operators (i.e., visual attributes) sample different arrangements of wavelet coefficients. For example, the attribute $f_1(i,j)$ may sample the quantized wavelet coefficients located in block 172, whereas the attribute $f_2(i,j)$ may sample the wavelet coefficients located in blocks 174. Both sets of coefficients, 172 and 174, may produce different numerical values ("00981" and "00793") for their respective attributes as shown in FIG. 25. However, as noted hereinbefore, it may be possible that both sets of coefficients, 172 and 174, may produce identical numerical values for their respective attributes.

Figure 26:
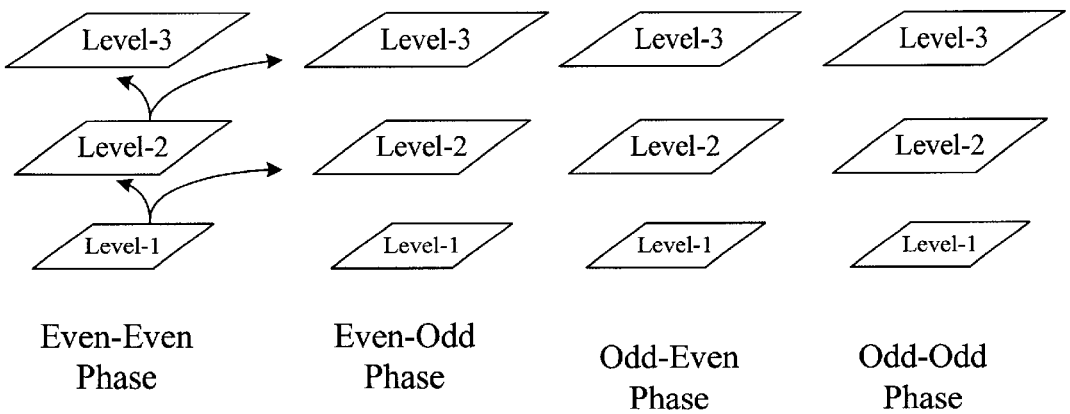
FIG. 26 shows a simplified illustration of how the over-complete wavelet transform of an input image is generated.

FIG. 26 shows a simplified illustration of how the overcomplete wavelet transform of an input image (e.g., the input image 76) is generated. As noted hereinbefore, the overcomplete wavelet transform of corresponding images may be generated during training of detectors (FIG. 21, block 136) and also during the actual detection of objects (FIG. 23, block 150). The overcomplete wavelet transform is a redundant version of the ordinary wavelet transform. As noted hereinbefore, each wavelet transform in the preferred embodiment may consist of three (3) levels (see, for example, FIG. 10). In the overcomplete wavelet transform, each level is represented by four (4) redundant "phases." FIG. 26 illustrates four such phases—the even-even phase, the even-odd phase, the odd-even phase, and the odd-odd phase—for each level. In the embodiment illustrated in FIG. 26, these four phases are initially generated for the first level from the input image. Then, the LL subband of the even-even phase of the first level is expanded to generate all four phases for the second level. Similarly, all phases of the third level are finally generated from the LL subband of the even-even phase of the second level. However, any phase other than the even-even phase may be similarly selected to generate the remaining subsequent level in the wavelet transform. In one embodiment, in training, all the phases are expanded exhaustively and, in detection, only the even-even phases are expanded. It is noted that by training a detector on each phase in each level of the overcomplete wavelet transform, the detector will be able to accommodate small shifts in the position of the object (equivalent to a shift of one wavelet coefficient). Similarly, during detection, the detector may be evaluated for each phase at each level in the overcomplete wavelet transform as discussed hereinbelow.

As mentioned hereinbefore, the object finder 18 (i.e., each view-based detector in the object finder 18) searches the input image exhaustively in position and scale to find objects. A direct implementation of this search may take a long time to compute. Therefore, each view-based detector uses a heuristic coarse-to-fine strategy to speed up the search process. In the discussion given hereinbelow, the image window 60 is "placed" at each level of the wavelet transform of the image (as shown and discussed with reference to FIG. 27), and all the computations are performed with appropriate wavelet transform coefficients. The image window 60, therefore, does not appear on the actual, physical image (e.g., the image 76 in FIGS. 24, 25). Furthermore, although the discussion herein may relate the location of an image window in the wavelet domain to a physical location on the corresponding image, the fixed-size image window is used only as a computational tool to facilitate computations in the wavelet domain, and not to refer to an actual physical appearance of such a window across the wavelet transform or across the image.

Figure 27:
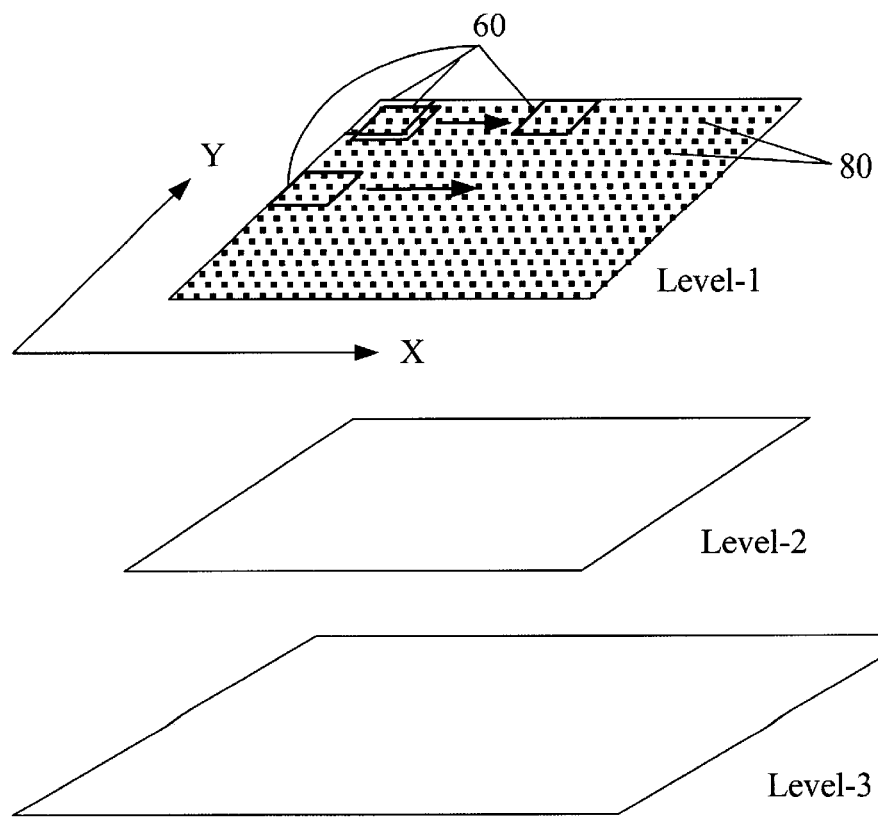
FIG. 27 is a simplified illustration of three levels of wavelet transform coefficients in the image window-based object detection using the coarse-to-fine search strategy according to the present invention.

FIG. 27 is a simplified illustration of three levels of wavelet transform coefficients in the image window-based object detection using the coarse-to-fine search strategy according to the present invention. Initially, at block 152, the detector partially evaluates the log-likelihood ratio (in equations 8 or 8A) for each possible object location (within each image window 60) using a first low resolution visual attribute (e.g., an attribute that uses level-1 coefficients) or a group of low resolution visual attributes. For example, in the preferred embodiment, the attribute $f_1$ is evaluated first at each location of the image window 60 as shown in FIG. 27. This may be done by first pre-computing all the attribute values for attributes $f_1$ through $f_{17}$ at all coordinate locations within each image window 60 location for an input (or scaled) image. Thereafter, the image window 60 is placed at a first predetermined location on the overcomplete wavelet transform of the image (input image or a scaled version of the input image) and the log-likelihood ratio for the corresponding low resolution attribute (here, the attribute $f_1$) is computed as shown and discussed hereinbelow with reference to FIGS. 28–30. The image window 60 is then shifted one wavelet coefficient (as shown in FIG. 27) and the attribute $f_1$ is again evaluated at the new image window location. The process is repeated until all possible image window locations (lateral and diagonal) are covered for the entire level-1. It is noted that such image window locations may be partially overlapping. The object finder 18 keeps a record of all those image window locations at level-1 (FIG. 27) where the log-likelihood ratio for attribute $f_1$ is above a predetermined minimum threshold for attribute $f_1$ (block 153, FIG. 23). Thereafter, another low-level attribute (e.g., attribute $f_2$) is similarly evaluated, but only at those image window locations where the log-likelihood ratio for the attribute $f_1$ was above the predetermined minimum threshold for attribute $f_1$ (block 154). Thereafter, attribute $f_3$ is evaluated at only those image window locations where log-likelihood ratios for both attributes $f_1$ and $f_2$ were above their corresponding minimum thresholds. This further reduces the number of window locations where an attribute needs to be evaluated. This process of partial evaluation and elimination of unwanted image window locations is continued from low resolution to high resolution attributes until all the attributes (for levels 1, 2, and 3) are evaluated (block 154). It is noted that, in FIG. 27, wavelet coefficients 80 are shown for level-1 only for the sake of clarity and simplicity. Similar coefficients 80 may also be present for levels 2 and 3 as discussed hereinbefore. In one embodiment, minimum thresholds for attributes are selected empirically such that the detector is capable of detecting object in each of a set of hand-selected images.

It is therefore noted that the coarse-to-fine search strategy can be a many step process, where a partial evaluation of equation 8 (or 8A) can be done multiple times. After evaluating each attribute (e.g., attribute $f_1$) or a group of attributes (e.g., attributes $f_1, f_2$, and $f_3$), the object finder 18 may re-evaluate equation 8 or 8A. This re-evaluation will still be a partial re-evaluation, but will include more terms corresponding to the attributes that have been evaluated since the last partial evaluation. After each partial evaluation is completed, the object finder 18 may apply a threshold and remove additional candidates (i.e., parts of the image being searched) from further consideration as shown and discussed hereinbelow with reference to FIG. 28. Thus, the coarse-to-fine strategy focuses on attribute-by-attribute analysis and builds on earlier computations to generate the final result.

Figure 28:
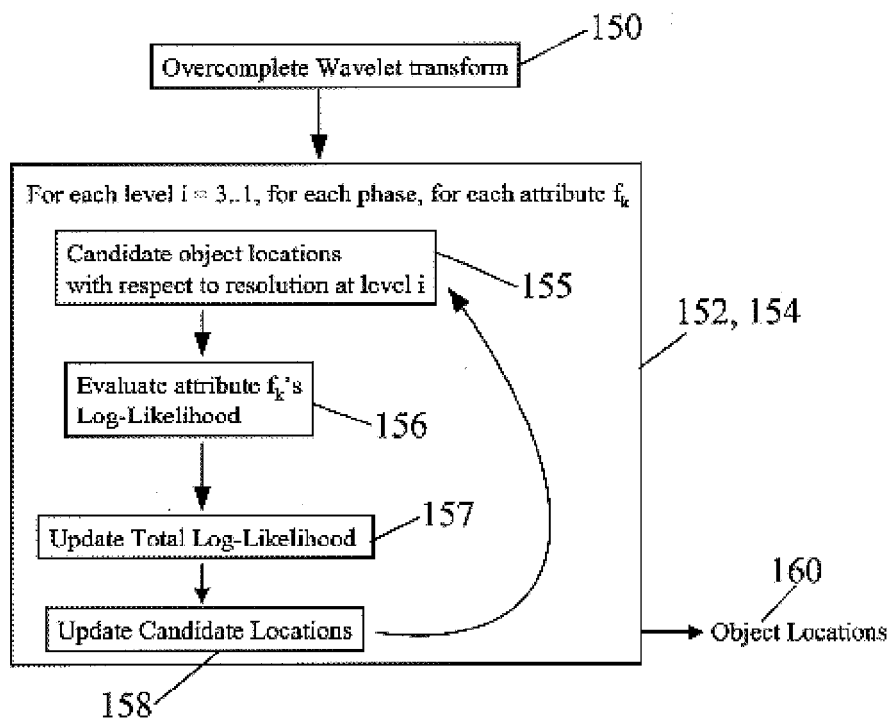
FIGS. 28–30 further illustrate the object detection process for one scale of the input image.
Figure 29:
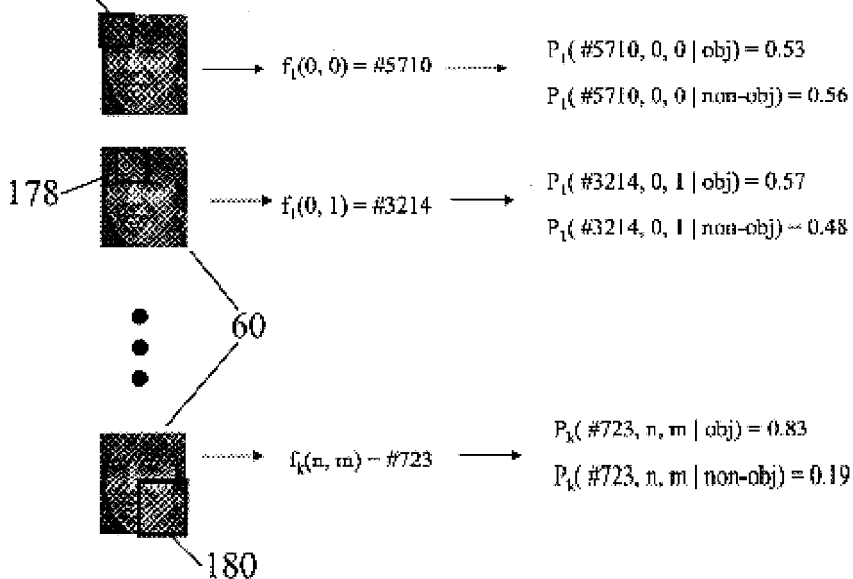
Figures 30, 32:
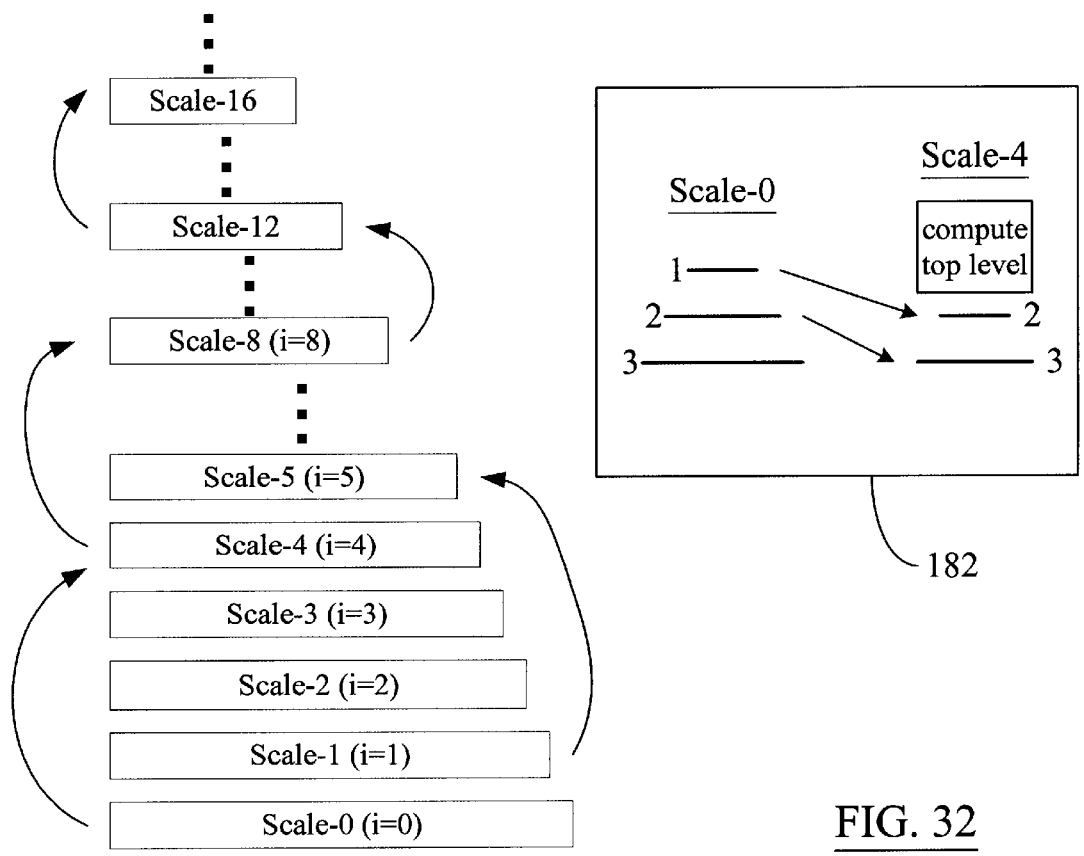
FIG. 32 further illustrates the details of the image scaling process and corresponding wavelet transform computation according to the present invention.

FIGS. 28–30 illustrate the object detection process for one scale of the input image 16. As mentioned hereinbefore, the computations are performed with wavelet coefficients (i.e., in the wavelet domain). As shown in FIG. 28, for each image scale, the process illustrated by blocks 155–158 is performed for each attribute $f_k$ (here, k=1 through 17), for each wavelet transform level (i=1,2,3) and for each phase (see, for example, FIG. 26) of the corresponding wavelet transform level. Initially, at block 155, the evaluation may start with a low-resolution attribute (block 152, FIG. 23) for each candidate object locations (i.e., the image window 60 locations) on the given image. The log-likelihood value for the corresponding attribute (e.g., attribute $f_1$) may then be evaluated at block 156. Then, the object finder 18 may update the total of the log-likelihood values computed so far (block 157) for corresponding image windows and also update the candidate locations to be evaluated next (block 158). The coarse-to-fine strategy may reduce the candidate locations that may need to be evaluated at each successive iteration of the process illustrated in FIG. 28. Finally, the total of the log-likelihood values (generated at block 157) for all attributes (here, $f_1$ through $f_{17}$) is compared with "λ" for each corresponding image window location to determine whether the object is present. The output of this decision step is then generated at block 160, thereby identifying object locations at a given scale of the input image.

FIGS. 29 and 30 further illustrate the decision process for one image window 60. As noted hereinbefore, the log-likelihood ratios are determined based on the pre-computed log-likelihood tables (FIGS. 18–22). As discussed hereinbefore, each local operator or visual attribute represents a different area on the image. For example, the image areas 176 and 178 correspond to the attribute $f_1(i,j)$ at locations (0,0) and (0,1) respectively; whereas, the image area 180 corresponds to the attribute $f_k(i,j)$ at the location (n,m) as shown in FIG. 29. During each attribute evaluation, the detector consults appropriate pre-computed log-likelihood tables to determine whether the corresponding log-likelihood value for the attribute is above the minimum threshold (block 153) or, during the final stage of object detection, whether an object is present in a given image window (block 160). An example of such a decision process is illustrated in FIGS. 29 and 30 for one image window (i.e., image window 60 in FIG. 29). The probability look-up and decision-making stages in FIGS. 29 and 30 are performed by each detector for each appropriate image window location and for each scaled version of the input image (scaling is discussed hereinbelow with reference to FIGS. 31 and 32). A detection output is generated for each image window 60 evaluated by the detector using the coarse-to-fine search strategy discussed hereinbefore. All such detection outputs (for all image windows on the image 16) are then combined to produce the final result—an example of which is illustrated in the picture slide 44 in FIG. 6 for one view-based classifier.

After classifying the input image 16 at all positions within one scale, the detector scales or resizes the image (as illustrated through some exemplary scales in FIG. 8), re-computes the wavelet transform of the scaled image, and continues exhaustive object search at all positions within that new resized image (blocks 164, 149). The scaling or resizing of the input image 16 may be desirable to detect certain object sizes that may not have fit within the image window 60 when original image was searched. Scaling or shrinking of the image may allow a larger object to fit within the image window 60, and hence, to obtain a better detection. It is noted that the size and shape of the image window 60 itself does not change throughout different levels of scaling/resizing (as illustrated with the fixed-size image window 60 in FIG. 8).

Figure 31:
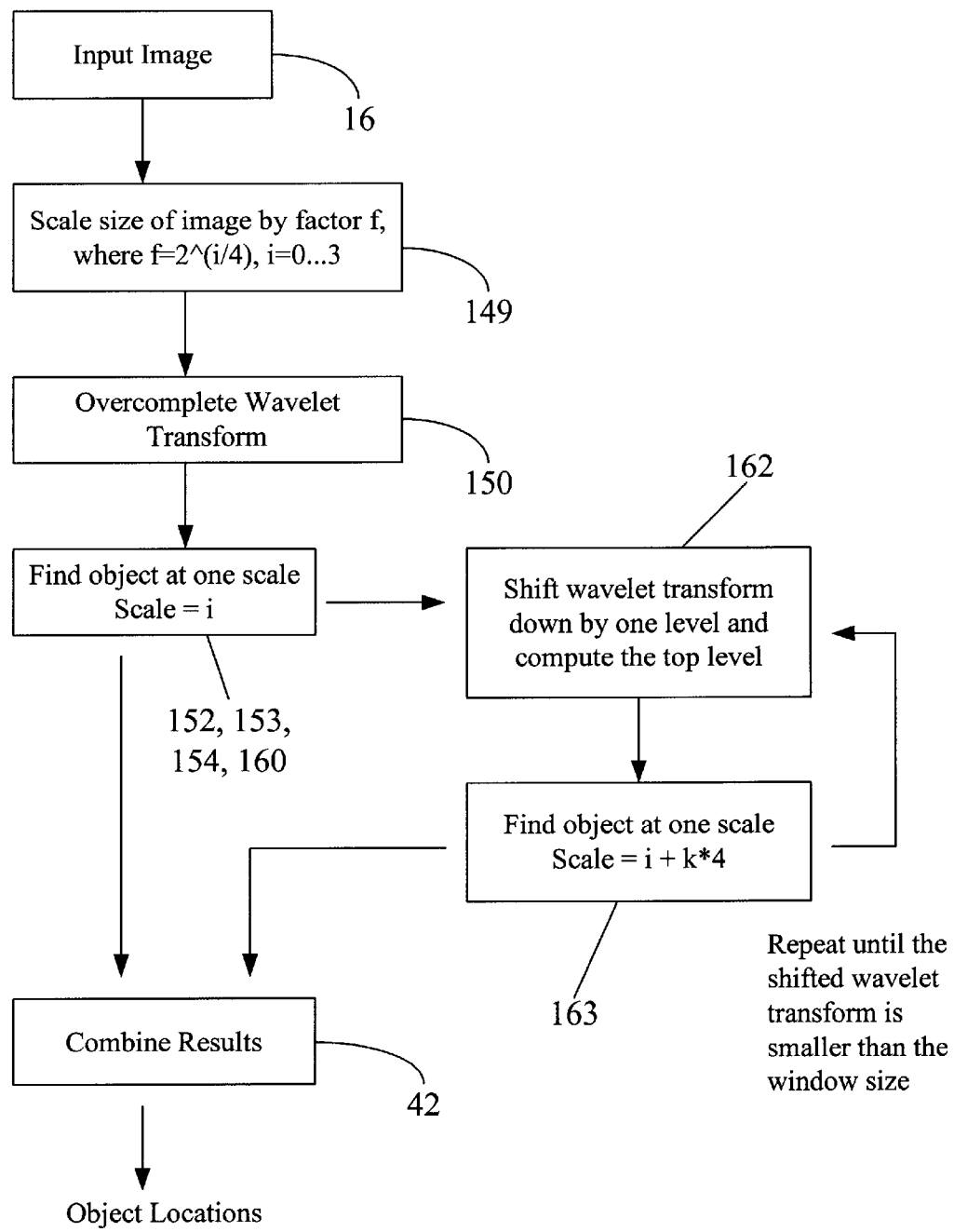
FIG. 31 illustrates the image scaling process as part of the overall object detection process shown in FIG. 23.

FIG. 31 illustrates the image scaling process as part of the overall object detection process shown in FIG. 23. FIG. 32 further illustrates the details of the image scaling process and corresponding wavelet transform computation according to the present invention. In one embodiment, the input image 16 is scaled (block 149) by a factor "f" given by:

$$f = 2^{\left(\frac{i}{4}\right)}, \text{ where } i = 0, 1, 2, 3 \ldots \qquad (12)$$

Thus, for example, for i=2, f=1.41. Hence, the image is reduced by factor "f". In other words, the new scaled image (for i=2) is 0.71 (1/f) in size as compared to the original image (for i=0). Thus, the size (along any dimension, e.g., horizontal) of the image to be evaluated can be expressed by N=(1/f)*S, where N is the size of the input image currently evaluated by the corresponding detector, and S is the original size of the input image. It is noted that the input image is scaled to many values of "i" (e.g., for i=0 . . . 19), but, as discussed hereinbelow, to obtain the wavelet transform for each successive scale, the entire wavelet transform does not always need to be computed in its entirety.

As shown in FIG. 32, all three levels of the wavelet transform may need to be computed for the first four scales (scales 0 through 3) of the input image (corresponding to i=0 . . . 3). Thus, for the first octave of search in scale (corresponding to the first four scales given by equation 12), each level of the wavelet transform is recomputed in its entirety at each scaling. However, after these first four scalings, the object finder 18 "reuses" parts of the wavelet transform computed at previous scalings as illustrated in FIG. 32. This is done by selecting the wavelet transform corresponding to the scaling that differs by one octave (i.e., four (4) scalings) from the current scaling. Thus, for example, to compute the wavelet transform for scale-i (where i≧4 in equation-12), the wavelet transform for scale (i−4) may be utilized. Because, the wavelet transform for scale-i (i≧4) is related to the wavelet transform at scale (i−4) by a shift in levels. For example, the wavelet transform at scale−4 is related to that at scale−0, and the wavelet transform at scale−5 is related to that at scale−1, and so on as illustrated in FIG. 32.

To obtain the wavelet transform at scale-i (i≧4), the object finder 18 shifts the wavelet transform for scale (i−4) by one level. That is, level-1 at scale (i−4) becomes level-2 at scale-i (for i≧4), and level-2 at scale (i−4) becomes level-3 at scale-i as shown in FIG. 32 with reference to scales 0 and 4. Therefore, the object finder 18 needs to compute only the top level (i.e., level-1) for each scale-i (i≧4), rather than computing the entire transform (i.e., levels 1 through 3) for the new scale-i. Blocks 162 and 163 in FIG. 31 illustrate the scaling and partial re-use of the wavelet transform discussed hereinabove. As shown by the feedback arrow at block 163 in FIG. 31, the wavelet transform re-use and extensive object search (as given by blocks 150, 152, 153, 154, and 160 in FIG. 23) is continued for each scale until the shifted wavelet transform at block 162 is smaller than the size of the image window 60. For example, for i=0 . . . 3, the object finder 18 may search the object at scales (i+k*4, where k≧1). For example, for scales 0 through 3, the corresponding scales that may be searched by the object finder 18 include scales 4 through 7 (for k=1 at block 163), 8 through 11 (for k=2 at block 163), 12 through 15 (for k=3 at block 163), 16 through 19 (for k=4 at block 163), and so on until the shifted wavelet transform for a given scale is smaller than the image window size. Such an extensive scanning for each image size and image window location improves accuracy of detection.

Figure 33:
FIGS. 33–34 depict various images of humans with the object markers placed on the human faces detected by the object finder according to the present invention.
Figure 34:
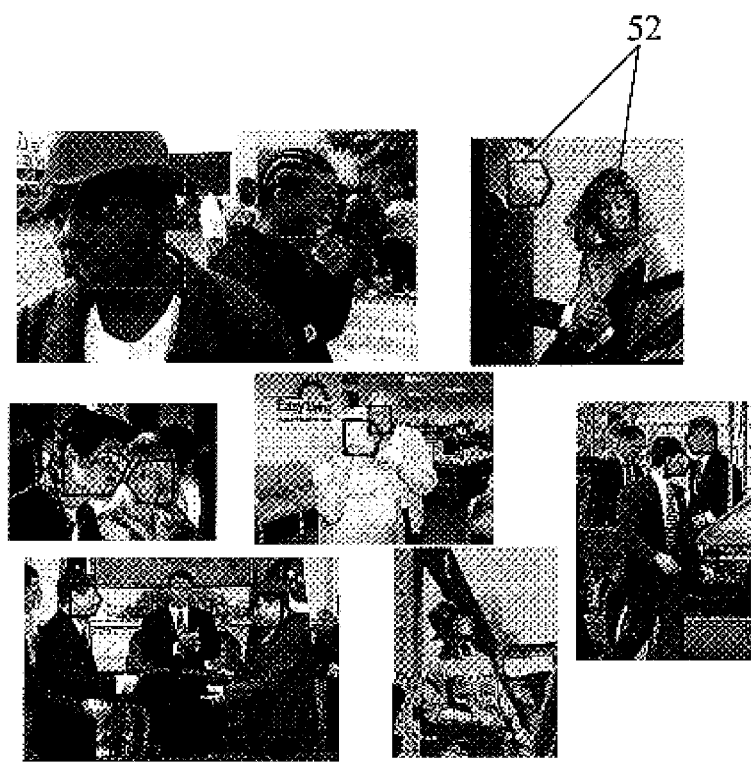
Figure 35:
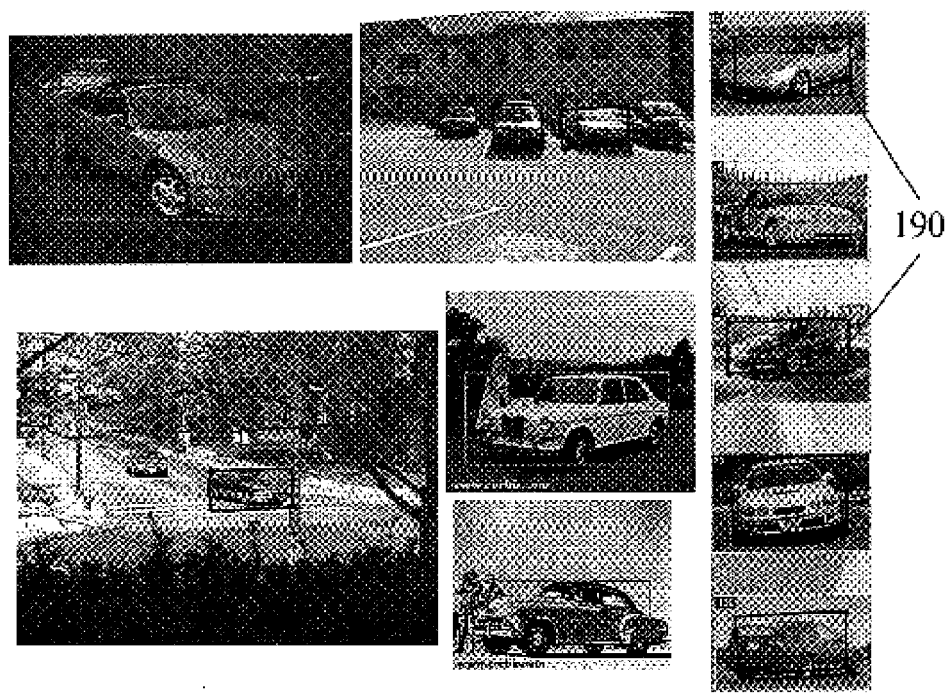
FIGS. 35–36 illustrate various images of cars with the object markers placed on the cars detected by the object finder.
Figure 36:
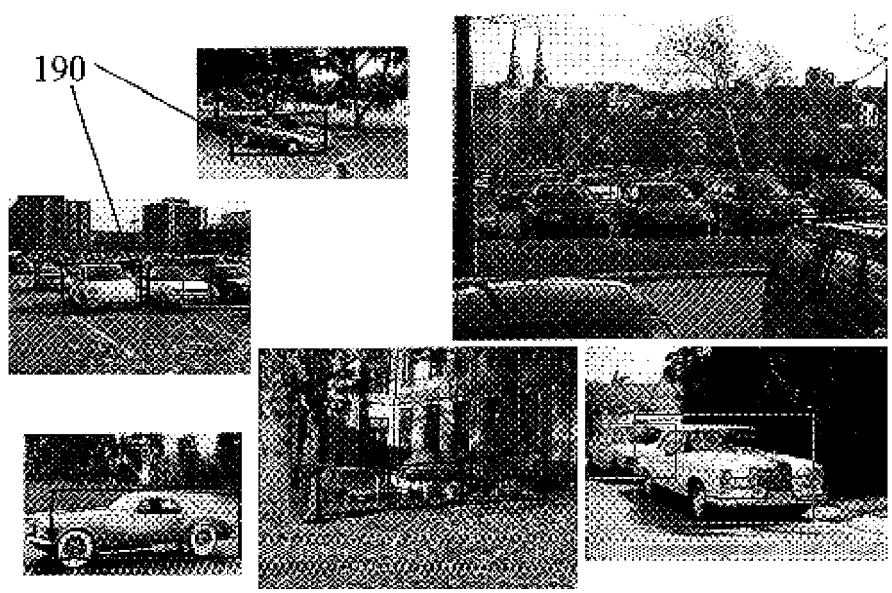

FIGS. 33 and 34 depict various images of humans with the object markers 52 placed on the human faces detected by the object finder 18 according to the present invention. The object markers may point towards left if the detected human face has a left orientation or towards right if the face has a right orientation as is shown in FIGS. 33 and 34. Similarly, FIGS. 35 and 36 illustrate various images of cars with the object markers 190 placed on the cars detected by the object finder 18. FIGS. 33–36 thus show results of object detection for objects (here, human faces and cars) of different sizes, shapes, and orientations, and for images representing intra-class object variations, lighting variations, geometric variations, etc. It is noted that the object markers 52, 190 may be of any desired shape.

In one embodiment, experiments have shown that the coarse-to-fine search strategy reduces computational time by a factor of several hundreds over an exhaustive full evaluation of every possible object location in position and scale. Furthermore, the coarse-to-fine search strategy discussed hereinabove may be implemented with other object detectors. For example, the face detector discussed in H. Schneiderman and T. Kanade, "Probabilistic Modeling of Local Appearance and Spatial Relationships for Object Recognition", CVPR, pp. 45–51, 1998 (hereafter, "Schneiderman and Kanade"), may be optimized using the coarse-to-fine search strategy discussed hereinabove.

Combining Detections Within and Across View-Based Detectors

Typically, when the detector encounters a face, it does not give one single large response (for the left side of equations 8 and 8A) at one location that is greater than the threshold (i.e., the right side of equations 8 or 8A). It gives a number of large responses at adjacent locations all corresponding to the same face that all exceed the detection threshold. Furthermore, multiple view-based detectors may detect the same object at the same location. For example, FIG. 6 shows a case where the same face (the female in the foreground of the photograph) is initially detected by two of the view-based detectors. To resolve that all such multiple "detections" (here, two detections) are caused by the same object, the following approach may be used. First, the detection value (i.e., the left side of equations 8 and 8A) is computed for all viewpoints and at all locations within the image and all its scalings. Then, a list composed of all the locations for which the detection value is greater than the detection threshold is formed. This list is then put in order from the detection of the greatest magnitude (i.e. for which the value of the left side of equation 8 is largest) to that of the smallest magnitude. The first entry in this list is declared a real detection. Then this entry is compared to all others in the list. If another entry within the image is within a predetermined distance (in the preferred embodiment, the distance is half the radius of the object) of the first entry, it is assumed to correspond to the same object and it is discarded. After the first entry is compared to all other entries, this process repeats for the entry in the remaining list that has the largest magnitude (after the first entry and all entries matching to it have been removed); that is, this entry is now declared to be another real detection and is compared to all other entries in the remaining list whereby any entries that are close in distance to it are discarded. This process continues until the list is exhausted.

Accuracy of Face Detection with Out-of-Plane Rotation

To test the accuracy of the object finder 18 to detect faces with out-of-plane rotation, a test set of 208 images with 441 faces was collected. Out of these 441 faces, 347 faces were in the profile view. These images were gathered from various web sites on the World Wide Web. The accuracy of detection is shown hereinbelow in Table-1 for different sensitivities ($\gamma$), where the last row indicates the minimum error performance:

TABLE 1

Face detection with out-of-plane rotation

| $\Gamma$ | Detection (all faces) | Detection (profiles) | False Detections |
|---|---|---|---|
| 0.0 | 92.7% | 92.8% | 700 |
| 1.5 | 85.5% | 86.4% | 91 |
| 2.5 | 75.2% | 78.6% | 12 |

Here, $\gamma$ is a linear scaling of $\lambda$ in equation (8) given hereinabove. FIG. 30, for example, shows images with detection results for $\gamma=1.5$.

In face detection experiments, some differences were noticed in performance between the object finder 18 described hereinabove and an improved version of the detector described in Schneiderman and Kanade. Both of these detectors use similar probabilistic structures but differ mainly in that the detector in Schneiderman and Kanade uses visual attributes based on localized eigenvectors rather than wavelet coefficients used by the object finder 18. It is noted that similar to Schneiderman and Kanade, the object finder 18 according to the present invention represents feature measurements as statistically independent. However, the object finder 18 uses a wavelet-based improved method for selecting features. The method discussed in Schneiderman and Kanade forms features from localized eigenvectors. Thus, statistical dependencies that do not lie in the subspace spanned by the eigenvectors or that lie beyond the spatial extent of the eigenvectors are not represented. However, statistical dependency may exist in both cases. As discussed hereinbefore, the object finder 18, on the other hand, allows modeling of dependencies among arbitrary groups of up to 8 wavelet coefficients. The object finder 18 also provides a method for choosing effective features as a function of the mutual information between pairs of coefficients. By choosing features this way, the object finder 18 may capture the strongest relationships in the input image data.

The wavelet-based object finder 18 performs much better for profile faces. However, the eigenvector detector performs slightly better on frontal faces. Table-2 given hereinbelow compares these detectors with others on the combined test sets of Sung and Poggio [K. K. Sung, T. Poggio, "Example-based Learning of View-Based Human Face Detection", ACCV, 1995, and Artificial Intelligence Memo # 1521, 1572, Massachusetts Institute of Technology] and Rowley, Baluja, and Kanade [H. Rowley, S. Baluja, T. Kanade, "Neural Network-Based Face Detection", PAMI, 20(1), January, 1998].

TABLE 2

Frontal face detection

| | Detection rate | False detections |
|---|---|---|
| Schneiderman and Kanade* eigenvector | 94.4% (95.8%) | 65 |
| Roth, Yang, Ahuja* | (94.8%) | 78 |
| Object Finder 18* wavelet | 90.2% (91.8%) | 110 |
| Rowley, Baluja, Kanade | 86.0% | 31 |

The "*" in Table-2 indicates that 5 images of line-drawn faces were excluded leaving 125 images with 483 labeled faces. However, there are at least 10 additional human faces that are not labeled. The numbers not in parentheses indicate results on just the 483 labeled faces. To be consistent with Roth, Yang, Ahuja [D. Roth, M-H. Yang, N. Ahuja, "A SnoW-Based Face Detector", NIPS-12, 1999], the numbers in parentheses indicate the ratio between the total number of faces found by computer and 483.

Accuracy of Car Detection

The object finder 18 can reliably detect passenger cars over a range of viewpoints. To test its accuracy, a test set of 104 images was collected. The 104 images contain 213 cars which span a wide variety of models, sizes, orientations, background scenery, lighting conditions, and include some partial occlusion using several cameras. Some of the images were also collected from the Internet. The overall performance was as given in Table-3.

TABLE 3

Car detection

| $\gamma$ | Detections | False Detections |
|---|---|---|
| 1.05 | 83% | 7 |
| 1.0 | 86% | 10 |
| 0.9 | 92% | 71 |

FIG. 33, for example, shows images with detection results for $\gamma=1.0$.

The foregoing describes a system and method for detecting presence of a 3D object in a 2D image containing a 2D representation of the 3D object. The object finder according to the present invention improves upon existing methods of object detection both in accuracy and computational properties. These improvements are based around a novel use of the wavelet transform for object detection. A pre-selected number of view-based detectors are trained on sample images prior to performing the detection on an unknown image. These detectors then operate on the given input image and compute a quantized wavelet transform for the entire input image. The object detection then proceeds with sampling of the quantized wavelet coefficients at different image window locations on the input image and efficient look-up of pre-computed log-likelihood tables to determine object presence. The object finder's coarse-to-fine object detection strategy coupled with exhaustive object search across different positions and scales results in an efficient and accurate object detection scheme. The object finder detects a 3D object over a wide range in angular variation (e.g., 180 degrees) through the combination of a small number of detectors each specialized to a small range within this range of angular variation.

The object finder according to the present invention also provides computational advantages over the existing state of the art. In particular, it is observed that although it may take many feature evaluations to confirm the presence of the object, it can often take only a few evaluations to confirm that an object is not present. It is therefore wasteful to defer a detection decision until all the features have been evaluated. The object finder thus discards non-object candidates after as few feature evaluations as possible. The coarse-to-fine strategy implemented by the object finder involves a sequential evaluation whereby after each feature evaluation, the object finder makes a decision about whether to conduct further feature evaluations or to decide that the object is not present. This strategy is applied to the multi-resolution representation provided by the wavelet transform whereby the feature evaluations are ordered from low-resolution features to high-resolution features. By doing so, the object finder efficiently rules out large regions first and thereby it only has to use the more computationally intensive high resolution features on a much smaller number of candidates.

The object finder may be trained to detect many different types of objects (e.g., airplanes, cats, trees, etc.) besides human faces and cars discussed hereinabove. Some of the applications where the object finder may be used include: commercial image databases (e.g., stock photography) for automatically labeling and indexing of images; an Internet-based image searching and indexing service; finding biological structures in various types of biological images (e.g., MRI, X-rays, microscope images, etc.); finding objects of military interest (e.g., mines, tanks, etc.) in satellite, radar, or visible imagery; finding objects of interest to scientists (e.g., craters, volcanoes, etc.) in astronomical images; as a tool for automatic description of the image content of an image database; to achieve accurate color balancing on human faces and remove "red-eye" from human faces in a digital photo development; for automatic adjustment of focus, contrast, and centering on human faces during digital photography; to automatically point, focus, and center cameras on human faces during video conferencing; enabling automatic zooming on human faces and also face recognition as part of a security and surveillance system; making human-computer interaction more realistic, especially in interactive computer games; and to perform face detection in real-time or near real-time.

While several embodiments of the invention have been described, it should be apparent, however, that various modifications, alterations and adaptations to those embodiments may occur to persons skilled in the art with the attainment of some or all of the advantages of the present invention. It is therefore intended to cover all such modifications, alterations and adaptations without departing from the scope and spirit of the present invention as defined by the appended claims.

What is claimed is:

1. A method to detect presence of a 3D (three dimensional) object in a 2D (two dimensional) image containing a 2D representation of said 3D object, said method comprising:

receiving a digitized version of said 2D image;

selecting one or more view-based detectors;

for each view-based detector, computing a wavelet transform of said digitized version of said 2D image, wherein said wavelet transform generates a plurality of transform coefficients, and wherein each transform coefficient represents visual information from said 2D image that is localized in space, frequency, and orientation;

applying said one or more view-based detectors in parallel to respective plurality of transform coefficients, wherein each view-based detector is configured to:

compute a likelihood ratio based on visual information received from corresponding waveform coefficients;

compare said likelihood ratio to a predetermined threshold value; and detect a specific orientation of said 3D object in said 2D image based on said comparison of said likelihood ratio to said predetermined threshold value;

combining results of application of said one or more view-based detectors; and determining orientation and location of said 3D object from said combination of results of application of said one or more view-based detectors.

2. The method of claim 1, further comprising developing said one or more view-based detectors from a pre-selected set of training images.

3. The method of claim 2, wherein developing said one or more view-based detectors includes the following for at least one of said one or more view-based detectors:

selecting at least one correction factor, wherein said at least one correction factor is configured to correct the light intensity level of at least one of said training images;

selecting a first value for said at least one correction factor;

applying said first value for said at least one correction factor to said at least one of said training images;

examining an effect on appearance of said at least one of said training images after application of said first value of said at least one correction factor thereto;

selecting a second value of said at least one correction factor based on said effect on the appearance of said at least one of said training images; and continuing selection, application, and examination until a desired effect on the appearance of said at least one of said training images is obtained.

4. The method of claim 3, wherein selecting at least one correction factor includes selecting two correction factors, and wherein each of said two correction factors is applied to a different half of said at least one of said training images.

5. The method of claim 2, wherein developing said one or more view-based detectors includes the following for at least one of said one or more view-based detectors:

defining a plurality of attributes;

selecting an image window, wherein said image window is configured to be placed at a plurality of locations on each of said training images;

for each attribute, determining corresponding attribute values at a plurality of coordinates at one of said plurality of locations of said image window by training a plurality of instances of said at least one view-based detector on said pre-selected set of training images;

for each of said plurality of instances, computing a respective weight to be applied to corresponding attribute values for said each attribute at said one of said plurality of locations of said image window;

for each of said plurality of instances, applying said respective weight to corresponding attribute values for each attribute at said plurality of coordinates at said one of said plurality of locations of said image window, thereby generating a set of weighted attribute values for each attribute for each of said plurality of coordinates at said one of said plurality of locations of said image window; and for each of said plurality of coordinates and for each attribute, combining corresponding weighted attribute values in said set of weighted attribute values, thereby generating a single attribute value for each attribute at said each of said plurality of coordinates at said one of said plurality of locations of said image window.

6. The method of claim 1, wherein computing said wavelet transform includes:

computing said wavelet transform for a first scale of said 2D image, thereby generating a plurality of wavelet transform levels at said first scale; and reusing at least one of said plurality of wavelet transform levels as part of said wavelet transform for a second scale of said 2D image when computing said wavelet transform for said second scale.

7. The method of claim 6, wherein said first and said second scales differ from one another by one octave.

8. The method of claim 6, wherein said plurality of wavelet transform levels includes three levels, and wherein said wavelet transform for said second scale reuses two lower resolution levels from said three wavelet transform levels for said first scale.

9. The method of claim 1, wherein applying said one or more view-based detectors in parallel includes the following for at least one of said one or more view-based detectors:

defining a plurality of attributes, wherein each attribute is configured to sample and quantize each of a predetermined number of transform coefficients from said plurality of transform coefficients;

selecting an image window, wherein said image window is configured to represent a fixed size area of said 2D image;

placing said image window at one of a plurality of locations within said 2D image;

selecting two correction factors, wherein each of said two correction factors is configured to correct the light intensity level for a corresponding half of said image window at said one of said plurality of locations;

selecting a predetermined number of correction values for each of said two correction factors;

for each of said two correction factors and for each of said predetermined number of correction values therefor, evaluating the total log-likelihood ratio value for said plurality of attributes for the corresponding half of said image window at said one of said plurality of locations;

for each half of said image window at said one of said plurality of locations, selecting the largest total log-likelihood ratio value for said plurality of attributes; and adding corresponding largest total log-likelihood ratio value for said each half of said image window to determine an overall log-likelihood ratio value, wherein said overall log-likelihood ratio value is used to estimate the presence of said 3D object, and wherein said overall log-likelihood value is said computed likelihood ratio of claim 1.

10. The method of claim 1, wherein applying said one or more view-based detectors in parallel includes the following for at least one of said one or more view-based detectors:

defining a plurality of attributes, wherein each attribute is configured to sample and quantize each of a predetermined number of transform coefficients from said plurality of transform coefficients;

selecting an image window, wherein said image window is configured to represent a fixed size area of said 2D image;

placing said image window at a first one of a first plurality of locations within said 2D image;

for each of said plurality of attributes, determining a corresponding attribute value at each of a first plurality of coordinates within said image window at said first location;

for each of said plurality of attributes, obtaining a first class-conditional probability for an object class and a second class-conditional probability for a non-object class at said each of said first plurality of coordinates based on said corresponding attribute values determined at said first plurality of coordinates;

estimating presence of the 3D object in said image window at said first location based on said comparison of said likelihood ratio to said predetermined threshold value, wherein said likelihood ratio is defined by a ratio of a first product and a second product, wherein said first product includes a product of all of said first class-conditional probabilities and wherein said second product includes a product of all of said second class-conditional probabilities;

moving said image window to a second one of said first plurality of locations within said 2D image; and continuing determination of said corresponding attribute values and said first and said second class-conditional probabilities, and estimation of the presence of said 3D object in said image window at said second location and at each remaining location in said first plurality of locations within said 2D image.

11. The method of claim 10, wherein said first and said second class-conditional probabilities are obtained by looking-up a pre-computed set of log-likelihood tables using corresponding attribute values.

12. The method of claim 10, wherein said image window is rectangular.

13. The method of claim 10, wherein said plurality of attributes includes seventeen attributes.

14. The method of claim 10, wherein said each attribute is configured to sample and quantize eight transform coefficients.

15. The method of claim 10, wherein said each attribute quantizes said each of said predetermined number of transform coefficients into three levels.

16. The method of claim 10, further comprising the following for at least one of said one or more view-based detectors:

scaling said 2D image to one of a predetermined number of scale levels, thereby generating a scaled image;

placing said image window at a third one of a second plurality of locations within said scaled image;

for each of said plurality of attributes, determining said corresponding attribute value at each of a second plurality of coordinates within said image window at said third location;

for each of said plurality of attributes, obtaining a third class-conditional probability for said object class and a fourth class-conditional probability for said non-object class at said each of said second plurality of coordinates based on said corresponding attribute values determined at said second plurality of coordinates;

estimating presence of the 3D object in said image window at said third location based on a ratio of a third product and a fourth product, wherein said third product includes a product of all of said third class-conditional probabilities and wherein said fourth product includes a product of all of said fourth class-conditional probabilities;

moving said image window to a fourth one of said second plurality of locations within said scaled image; and continuing determination of said corresponding attribute values and said third and said fourth class-conditional probabilities, and estimation of the presence of said 3D object in said image window at said fourth location and at each remaining location in said second plurality of locations within said scaled image.

17. The method of claim 16, wherein said predetermined number of scale levels is determined based on the size of the 2D image.

18. The method of claim 16, wherein scaling said 2D image is continued until the scaled version of said 2D image is smaller than the size of said image window.

19. The method of claim 1, wherein applying said one or more view-based detectors in parallel includes the following for at least one of said one or more view-based detectors:

defining a plurality of attributes, wherein each attribute is configured to sample and quantize each of a predetermined number of transform coefficients from said plurality of transform coefficients;

selecting an image window, wherein said image window is configured to represent a fixed size area of said 2D image;

placing said image window at a plurality of locations within said 2D image;

for each attribute in a subset of said plurality of attributes, determining a corresponding attribute value at each of a plurality of coordinates within said image window at each of said plurality of locations;

for each attribute in said subset of said plurality of attributes, obtaining a first class-conditional probability for an object class and a second class-conditional probability for a non-object class at said each of said plurality of coordinates at said each of said plurality of locations based on said corresponding attribute values determined at said plurality of coordinates;

for each one of said plurality of locations of said image window, computing said likelihood ratio, wherein said likelihood ratio is a division of a first product and a second product, and wherein said first product includes a product of all of said first class-conditional probabilities and wherein said second product includes a product of all of said second class-conditional probabilities at corresponding one of said plurality of locations;

for each one of said plurality of locations of said image window, determining if said likelihood ratio at corresponding one of said plurality of locations is above said predetermined threshold value; and for each one of said plurality of locations of said image window, estimating presence of said 3D object only if said likelihood ratio at corresponding one of said plurality of locations is above said predetermined threshold value.

20. The method of claim 1, wherein applying said one or more view-based detectors in parallel includes the following for at least one of said one or more view-based detectors:

defining a plurality of attributes, wherein each attribute is configured to sample and quantize each of a predetermined number of transform coefficients from said plurality of transform coefficients;

for each of said plurality of attributes, determining a corresponding attribute value at each of a plurality of coordinate locations within said 2D image;

selecting an image window, wherein said image window is configured to represent a fixed size area of said 2D image;

placing said image window at a first one of a plurality of locations within said 2D image;

for each of said plurality of attributes, selecting those corresponding attribute values that fall within said first location of said image window;

for each of said plurality of attributes, obtaining a first class-conditional probability for an object class and a second class-conditional probability for a non-object class based on said selected attribute values that fall within said first location of said image window;

estimating presence of the 3D object in said image window at said first location based on said comparison of said likelihood ratio to said predetermined threshold, wherein said likelihood ratio is defined by a ratio of a first product and a second product, wherein said first product includes a product of all of said first class-conditional probabilities and wherein said second product includes a product of all of said second class-conditional probabilities;

moving said image window to a second one of said plurality of locations within said 2D image; and continuing selection of corresponding attribute values, determination of said first and said second class-conditional probabilities, and estimation of the presence of said 3D object in said image window at said second location and at each remaining location in said plurality of locations within said 2D image.

21. The method of claim 1, wherein said 3D object is a human face.

22. The method of claim 1, wherein said 3D object is a car.

23. The method of claim 1, further comprising placing a marker at said location of said 3D object upon detecting said location in said 2D image.

24. A computer-readable storage medium having stored thereon instructions, which, when executed by a processor, cause the processor to perform the following:

digitize a 2D (two dimensional) image, wherein said 2D image contains a 2D representation of a 3D (three dimensional) object;

compute a wavelet transform of said digitized version of said 2D image, wherein said wavelet transform generates a plurality of transform coefficients, and wherein each transform coefficient represents corresponding visual information from said 2D image;

place an image window of fixed size at a first plurality of locations within said 2D image;

evaluate a plurality of visual attributes at each of said first plurality of locations of said image window using corresponding transform coefficients to determine a likelihood ratio corresponding to said each of said first plurality of locations; and estimate the presence of said 3D object in said 2D image based on a comparison of said corresponding likelihood ratio to a predetermined threshold value at said each of said first plurality of locations.

25. The computer-readable storage medium of claim 24 having stored thereon instructions, which, when executed by the processor, cause the processor to further perform the following:

evaluate a subset of said plurality of visual attributes at said each of said first plurality of locations of said image window using corresponding transform coefficients to determine said likelihood ratio corresponding to said each of said first plurality of locations; and estimate the presence of said 3D object only at those of said first plurality of locations of said image window where said corresponding likelihood ratio for said subset of said plurality of visual attributes is above said predetermined threshold value.

26. The computer-readable storage medium of claim 24 having stored thereon instructions, which, when executed by the processor, cause the processor to further perform the following:

generate a scaled version of said 2D image;

place said image window of fixed size at a second plurality of locations within said scaled version of said 2D image;

evaluate said plurality of visual attributes at each of said second plurality of locations of said image window using corresponding transform coefficients to determine said likelihood ratio corresponding to said each of said second plurality of locations; and estimate the presence of said 3D object in said scaled version of said 2D image based on a comparison of said corresponding likelihood ratio to said predetermined threshold value at said each of said second plurality of locations.

27. The computer-readable storage medium of claim 24 having stored thereon instructions, which, when executed by the processor, cause the processor to display said 2D image with a visual marker placed where the presence of said 3D object is estimated.

28. A computer system, which, upon being programmed, is configured to perform the following:

receive a digitized version of a 2D (two dimensional) image, wherein said 2D image contains a 2D representation of a 3D (three dimensional) object;

select one or more view-based detectors;

for each view-based detector, compute a wavelet transform of said digitized version of said 2D image, wherein said wavelet transform generates a plurality of transform coefficients, and wherein each transform coefficient represents corresponding visual information from said 2D image;

apply said one or more view-based detectors in parallel to respective plurality of transform coefficients, wherein each view-based detector is configured to:

compute a likelihood ratio based on visual information received from corresponding waveform coefficients;

compare said likelihood ratio to a predetermined threshold value; and detect a specific orientation of said 3D object in said 2D image based on said comparison of said likelihood ratio to said predetermined threshold value;

combine results of application of said one or more view-based detectors; and determine orientation and location of said 3D object from said combination of results of application of said one or more view-based detectors.

29. The computer system of claim 28, which, upon being programmed, is further configured to perform the following for each of said one or more view-based detectors:

generate a scaled version of said 2D image;

place an image window of fixed size at a plurality of locations within said scaled version of said 2D image;

evaluate a plurality of visual attributes at each of said plurality of locations of said image window using corresponding transform coefficients to determine said likelihood ratio corresponding to said each of said plurality of locations; and estimate the presence of said 3D object in said scaled version of said 2D image based on a comparison of said corresponding likelihood ratio to said predetermined threshold value at said each of said plurality of locations.

30. The computer system of claim 28, which, upon being programmed, is further configured to perform the following for each of said one or more view-based detectors:

select a plurality of attributes, wherein each attribute is configured to sample and quantize each of a predetermined number of transform coefficients from said plurality of transform coefficients;

place an image window at a first one of a plurality of locations within said 2D image, wherein said image window is configured to represent a fixed size area of said 2D image;

for each of said plurality of attributes, determine a corresponding attribute value at each of a plurality of coordinates within said image window at said first location;

for each of said plurality of attributes, compute a first class-conditional probability for an object class and a second class-conditional probability for a non-object class at said each of said plurality of coordinates based on said corresponding attribute values determined at said plurality of coordinates;

estimate the presence of the 3D object in said image window at said first location based on said comparison of said likelihood ratio to said predetermined threshold, wherein said likelihood ratio is defined by a ratio of a first product and a second product, wherein said first product includes a product of all of said first class-conditional probabilities and wherein said second product includes a product of all of said second class-conditional probabilities;

move said image window to a second one of said plurality of locations within said 2D image; and continue determination of said corresponding attribute values and said first and said second class-conditional probabilities, and estimation of the presence of said 3D object in said image window at said second location and at each remaining location in said plurality of locations within said 2D image.

31. The computer system of claim 28, which, upon being programmed, is further configured to perform the following:

establish a communication link with a client computer over a communication network;

receive said digitized version of said 2D image from said client computer over said communication network;

determine the orientation and location of said 3D object in said 2D image received from said client computer; and send a notification of said orientation and location of said 3D object to said client computer over said communication network.

32. The computer system of claim 28, which, upon being programmed, is further configured to perform the following for each of said one or more view-based detectors:

select a plurality of attributes, wherein each attribute is configured to sample and quantize each of a predetermined number of transform coefficients from said plurality of transform coefficients;

place an image window at a plurality of locations within said 2D image, wherein said image window is configured to represent a fixed size area of said 2D image;

for each attribute in a subset of said plurality of attributes, determine a corresponding attribute value at each of a plurality of coordinates within said image window at each of said plurality of locations;

for each attribute in said subset of said plurality of attributes, compute a first class-conditional probability for an object class and a second class-conditional probability for a non-object class at said each of said plurality of coordinates at said each of said plurality of locations based on said corresponding attribute values determined at said plurality of coordinates;

for each one of said plurality of locations of said image window, compute said likelihood ratio, wherein said likelihood ratio is a division of a first product and a second product, and wherein said first product includes a product of all of said first class-conditional probabilities and wherein said second product includes a product of all of said second class-conditional probabilities at corresponding one of said plurality of locations;

for each one of said plurality of locations of said image window, determine if said likelihood ratio at corresponding one of said plurality of locations is above said predetermined threshold value; and for each one of said plurality of locations of said image window, estimating presence of said 3D object only if said likelihood ratio at corresponding one of said plurality of locations is above said predetermined threshold value.

33. A method to detect presence of a 3D (three dimensional) object in a 2D (two dimensional) image containing a 2D representation of said 3D object, said method comprising:

receiving a digitized version of said 2D image;

selecting one or more view-based detectors;

for each view-based detector, computing a wavelet transform of said digitized version of said 2D image, wherein said wavelet transform generates a plurality of transform coefficients, and wherein each transform coefficient represents visual information from said 2D image that is localized in space, frequency, and orientation;

applying said one or more view-based detectors in parallel to respective plurality of transform coefficients, wherein each view-based detector is configured to detect a specific orientation of said 3D object in said 2D image based on visual information received from corresponding transform coefficients; and wherein applying said one or more view-based detectors in parallel includes the following for at least one of said one or more view-based detectors:

defining a plurality of attributes, wherein each attribute is configured to sample and quantize each of a predetermined number of transform coefficients from said plurality of transform coefficients;

selecting an image window, wherein said image window is configured to represent a fixed size area of said 2D image;

placing said image window at one of a plurality of locations within said 2D image;

selecting two correction factors, wherein each of said two correction factors is configured to correct the light intensity level for a corresponding half of said image window at said one of said plurality of locations;

selecting a predetermined number of correction values for each of said two correction factors;

for each of said two correction factors and for each of said predetermined number of correction values therefor, evaluating the total log-likelihood value for said plurality of attributes for the corresponding half of said image window at said one of said plurality of locations;

for each half of said image window at said one of said plurality of locations, selecting the largest total log-likelihood value for said plurality of attributes; and adding corresponding largest total log-likelihood value for said each half of said image window to estimate the presence of said 3D object;

combining results of application of said one or more view-based detectors; and determining orientation and location of said 3D object from said combination of results of application of said one or more view-based detectors.

34. A method to detect presence of a 3D (three dimensional) object in a 2D (two dimensional) image containing a 2D representation of said 3D object, said method comprising:

receiving a digitized version of said 2D image;

selecting one or more view-based detectors;

for each view-based detector, computing a wavelet transform of said digitized version of said 2D image, wherein said wavelet transform generates a plurality of transform coefficients, and wherein each transform coefficient represents visual information from said 2D image that is localized in space, frequency, and orientation;

applying said one or more view-based detectors in parallel to respective plurality of transform coefficients, wherein each view-based detector is configured to detect a specific orientation of said 3D object in said 2D image based on visual information received from corresponding transform coefficients; and wherein applying said one or more view-based detectors in parallel includes the following for at least one of said one or more view-based detectors:

defining a plurality of attributes, wherein each attribute is configured to sample and quantize each of a predetermined number of transform coefficients from said plurality of transform coefficients;

selecting an image window, wherein said image window is configured to represent a fixed size area of said 2D image;

placing said image window at a first one of a first plurality of locations within said 2D image;

for each of said plurality of attributes, determining a corresponding attribute value at each of a first plurality of coordinates within said image window at said first location;

for each of said plurality of attributes, obtaining a first class-conditional probability for an object class and a second class-conditional probability for a non-object class at said each of said first plurality of coordinates based on said corresponding attribute values determined at said first plurality of coordinates;

estimating presence of the 3D object in said image window at said first location based on a ratio of a first product and a second product, wherein said first product includes a product of all of said first class-conditional probabilities and wherein said second product includes a product of all of said second class-conditional probabilities;

moving said image window to a second one of said first plurality of locations within said 2D image; and continuing determination of said corresponding attribute values and said first and said second class-conditional probabilities, and estimation of the presence of said 3D object in said image window at said second location and at each remaining location in said first plurality of locations within said 2D image;

combining results of application of said one or more view-based detectors; and determining orientation and location of said 3D object from said combination of results of application of said one or more view-based detectors.

35. A method to detect presence of a 3D (three dimensional) object in a 2D (two dimensional) image containing a 2D representation of said 3D object, said method comprising:

receiving a digitized version of said 2D image;

selecting one or more view-based detectors;

for each view-based detector, computing a wavelet transform of said digitized version of said 2D image, wherein said wavelet transform generates a plurality of transform coefficients, and wherein each transform coefficient represents visual information from said 2D image that is localized in space, frequency, and orientation;

applying said one or more view-based detectors in parallel to respective plurality of transform coefficients, wherein each view-based detector is configured to detect a specific orientation of said 3D object in said 2D image based on visual information received from corresponding transform coefficients; and wherein applying said one or more view-based detectors in parallel includes the following for at least one of said one or more view-based detectors:

defining a plurality of attributes, wherein each attribute is configured to sample and quantize each of a predetermined number of transform coefficients from said plurality of transform coefficients;

selecting an image window, wherein said image window is configured to represent a fixed size area of said 2D image;

placing said image window at a plurality of locations within said 2D image;

for each attribute in a subset of said plurality of attributes, determining a corresponding attribute value at each of a plurality of coordinates within said image window at each of said plurality of locations;

for each attribute in said subset of said plurality of attributes, obtaining a first class-conditional probability for an object class and a second class-conditional probability for a non-object class at said each of said plurality of coordinates at said each of said plurality of locations based on said corresponding attribute values determined at said plurality of coordinates;

computing a plurality of ratios, wherein each ratio corresponds to a different one of said plurality of locations of said image window, wherein said each ratio is a division of a first product and a second product, and wherein said first product includes a product of all of said first class-conditional probabilities and wherein said second product includes a product of all of said second class-conditional probabilities at corresponding one of said plurality of locations of said image window;

determining which of said plurality of ratios are above a predetermined threshold value; and estimating presence of said 3D object at only those of said plurality of locations where corresponding ratios are above said predetermined threshold value;

combining results of application of said one or more view-based detectors; and determining orientation and location of said 3D object from said combination of results of application of said one or more view-based detectors.

36. A method to detect presence of a 3D (three dimensional) object in a 2D (two dimensional) image containing a 2D representation of said 3D object, said method comprising:

receiving a digitized version of said 2D image;

selecting one or more view-based detectors;

for each view-based detector, computing a wavelet transform of said digitized version of said 2D image, wherein said wavelet transform generates a plurality of transform coefficients, and wherein each transform coefficient represents visual information from said 2D image that is localized in space, frequency, and orientation;

applying said one or more view-based detectors in parallel to respective plurality of transform coefficients, wherein each view-based detector is configured to detect a specific orientation of said 3D object in said 2D image based on visual information received from corresponding transform coefficients; and wherein applying said one or more view-based detectors in parallel includes the following for at least one of said one or more view-based detectors:

defining a plurality of attributes, wherein each attribute is configured to sample and quantize each of a predetermined number of transform coefficients from said plurality of transform coefficients;

for each of said plurality of attributes, determining a corresponding attribute value at each of a plurality of coordinate locations within said 2D image;

selecting an image window, wherein said image window is configured to represent a fixed size area of said 2D image;

placing said image window at a first one of a plurality of locations within said 2D image;

for each of said plurality of attributes, selecting those corresponding attribute values that fall within said first location of said image window;

for each of said plurality of attributes, obtaining a first class-conditional probability for an object class and a second class-conditional probability for a non-object class based on said selected attribute values that fall within said first location of said image window;

estimating presence of the 3D object in said image window at said first location based on a ratio of a first product and a second product, wherein said first product includes a product of all of said first class-conditional probabilities and wherein said second product includes a product of all of said second class-conditional probabilities;

moving said image window to a second one of said plurality of locations within said 2D image; and continuing selection of corresponding attribute values, determination of said first and said second class-conditional probabilities, and estimation of the presence of said 3D object in said image window at said second location and at each remaining location in said plurality of locations within said 2D image;

combining results of application of said one or more view-based detectors; and determining orientation and location of said 3D object from said combination of results of application of said one or more view-based detectors.

37. A computer system, which, upon being programmed, is configured to perform the following:

receive a digitized version of a 2D (two dimensional) image, wherein said 2D image contains a 2D representation of a 3D (three dimensional) object;

select one or more view-based detectors;

for each view-based detector:

compute a wavelet transform of said digitized version of said 2D image, wherein said wavelet transform generates a plurality of transform coefficients, and wherein each transform coefficient represents corresponding visual information from said 2D image;

select a plurality of attributes, wherein each attribute is configured to sample and quantize each of a predetermined number of transform coefficients from said plurality of transform coefficients;

place an image window at a first one of a plurality of locations within said 2D image, wherein said image window is configured to represent a fixed size area of said 2D image;

for each of said plurality of attributes, determine a corresponding attribute value at each of a plurality of coordinates within said image window at said first location;

for each of said plurality of attributes, compute a first class-conditional probability for an object class and a second class-conditional probability for a non-object class at said each of said plurality of coordinates based on said corresponding attribute values determined at said plurality of coordinates;

estimate the presence of the 3D object in said image window at said first location based on a ratio of a first product and a second product, wherein said first product includes a product of all of said first class-conditional probabilities and wherein said second product includes a product of all of said second class-conditional probabilities;

move said image window to a second one of said plurality of locations within said 2D image; and continue determination of said corresponding attribute values and said first and said second class-conditional probabilities, and estimation of the presence of said 3D object in said image window at said second location and at each remaining location in said plurality of locations within said 2D image;

apply said one or more view-based detectors in parallel to respective plurality of transform coefficients, wherein each view-based detector is configured to detect a specific orientation of said 3D object in said 2D image based on visual information received from corresponding transform coefficients;

combine results of application of said one or more view-based detectors; and determine orientation and location of said 3D object from said combination of results of application of said one or more view-based detectors.

* * * * *

UNITED STATES PATENT AND TRADEMARK OFFICE
CERTIFICATE OF CORRECTION

PATENT NO. : 6,829,384 B2
APPLICATION NO. : 09/795208
DATED : December 7, 2004
INVENTOR(S) : Schneiderman et al.

It is certified that error appears in the above-identified patent and that said Letters Patent is hereby corrected as shown below:

Column 2, line 67, delete "fall" and replace therewith --full--.

Column 8, line 16, delete "maybe" and replace therewith --may be--.

Column 9, line 21, delete "maybe" and replace therewith --may be--.

Column 16, line 2, delete "comers" and replace therewith --corners--.

Signed and Sealed this

First Day of May, 2007

JON W. DUDAS
*Director of the United States Patent and Trademark Office*